United States Patent [19]
Tweg et al.

[11] Patent Number: 6,104,345
[45] Date of Patent: Aug. 15, 2000

[54] DIRECTION OF ARRIVAL TRACKING OF MULTIPLE TARGETS

[75] Inventors: Reuven Tweg, Nesher; Mati Wax, Haifa, both of Israel

[73] Assignee: State of Israel, Ministry of Defense Armament Development Authority-Rafael, Haifa, Israel

[21] Appl. No.: 09/063,747

[22] Filed: Apr. 21, 1998

[30] Foreign Application Priority Data

Apr. 9, 1998 [IL] Israel ......................................... 124053

[51] Int. Cl.$^7$ ............................... G01S 5/02; G01S 13/00
[52] U.S. Cl. ........................... 342/417; 342/157; 342/158
[58] Field of Search ..................................... 342/417, 350, 342/443, 147, 158, 81, 85, 86, 140, 157

[56] References Cited

U.S. PATENT DOCUMENTS

| | | | |
|---|---|---|---|
| 5,210,798 | 5/1993 | Ekchian et al. ........................... | 382/14 |
| 5,262,789 | 11/1993 | Silverstein . | |
| 5,414,643 | 5/1995 | Blackman et al. ...................... | 364/516 |

OTHER PUBLICATIONS

C.R. Rao et al, "Tracking the Direction of Arrival of Multiple Moving Targets", IEEE Transactions on Signal Processing, vol. 42, No. 5, May 1994, pp. 1133–1144.

C.R. Sastry et al, "An Efficient Algorithm for Tracking the Angles of Arrival of Moving Targets", IEEE Transactions on Signal Processing, vol. 39, No. 1, Jan. 1991, pp. 242–246.

A. Satish, "Multiple Target Tracking Using Maximum Likelihood Principle", IEEE Transactions on Signal Processing, vol. 43, No. 7, Jul. 1995, pp. 1677–1693.

Samuel S. Blackman, Multiple–Target Tracking with Radar Applications, Artech House, 1986. pp. 26–27,54, 151, 173 and 292, 1986.

*Primary Examiner*—Thomas H. Tarcza
*Attorney, Agent, or Firm*—Wolf, Greenfield & Sacks, P.C.

[57] ABSTRACT

A method is provided for the direction of arrival (DOA) tracking of at least one source, along a single azimuth axis or along both azimuth and elevation axes. The method includes the steps of selecting all the high peaks from a DOA function as potential track points, converting the potential track points into a plurality of tracks and selecting a true track from the plurality of tracks.

22 Claims, 23 Drawing Sheets

DIRECTION OF ARRIVAL TRACKING OF MULTIPLE TARGETS

FIELD OF THE INVENTION

The present invention relates to the tracking of moving targets and more particularly to tracking the direction of arrival of multiple targets below the ambiguity threshold level.

BACKGROUND OF THE INVENTION

One of the parameters characterizing the performance of every Direction Finding (DF) system is the ambiguity threshold. The ambiguity threshold is the Signal-to-Noise Ratio (SNR) below which, for a given number of samples, the probability of an ambiguous Direction-of-Arrival (DOA) result rises and thereby sets a limit on the performance of the DF system.

The value of the ambiguity threshold depends critically on the array geometry. In certain arrays, such as uniform linear arrays with half a wavelength spacing, the threshold occurs at relatively low SNR and low number of samples, while in other arrays, such as sparse arrays, the threshold occurs at relatively high SNR and high number of samples.

To illustrate the performance of a DF system below the ambiguity threshold, reference is now made to FIG. 1 which is a histogram illustration of maximum likelihood estimation for 400 DOA results for a source having SNR of −4 dB. The source impinges from 100° on a sparse three-element linear array with inter-element spacing ration of 3:4 and aperture $3\lambda$, where $\lambda$ is the wavelength. The DOA was estimated by the deterministic maximum likelihood (DML) estimator from 100 samples of the array output. The highest peak, referenced 12, occurs at the true DOA of 100 degrees. In addition, there are high ambiguous peaks at 150° and at 60°, referenced 14 and 16, respectively. The ambiguous peaks 14 and 16 correspond to the secondary peaks of the multi-modal likelihood function which, as a result of the noise, occasionally exceed the main peak corresponding to the true DOA.

There are several approaches to the tracking of multiple targets. Various techniques for tracking the angles of arrival of moving targets have been proposed, for example, "*An Efficient Algorithm for Tracking the Angles of Arrival of Moving Targets*" by C. R. Sastry, E. W. Kamen and M. Simian, published by IEEE Trans on Signal processing, Vol.39:242–246 No. 1 January 1991. Further examples include: "*Tracking the Direction of Arrival of Multiple Moving Targets*" by C. R. Zao, C. R. Sastry and B. Zhou, published by IEEE Trans on Signal processing, Vol.42:1133–1144 No. 5 May 1994, and "*Multiple Target Tracking Using Maximum Likelihood Principle*" by A. SAtish and R. L. Kashyap, published by IEEE Trans on Signal processing, Vol.43:1677–1695 No.7 July 1995.

Reference is now made to FIGS. 2A–2F which are graphical illustrations of the likelihood function $\{L(\theta)\}$ of a typical source moving along the azimuth axis, $\theta$.

FIGS. 2A–2F are graphical illustrations of the likelihood function $\{L(\theta)\}$ of a typical source having a signal to noise ratio (SNR) of −4 dB moving from 85° (FIG. 2A) through 90° (FIG. 2B), 95° (FIG. 2C), 100° (FIG. 2D), 105° (FIG. 2E) and 110° (FIG. 2F) along the azimuth axis ($\theta$). The source is received by a three-element linear array with inter-element ratio of 3:4 and aperture of $3\lambda$. Each graph illustrates the directions-of arrival (DOA) likelihood function $\{L(\theta)\}$ for a plurality of samples (approximately 100) below the ambiguity threshold.

The peaks of $L(\theta)$ represent the most likely directions-of-arrival for the given batch. Generally, above the ambiguity threshold, the peak corresponding to the correct DOA is the highest. However, below the ambiguity threshold, the height of the ambiguous peaks rise and may exceed the peak corresponding to the correct DOA.

As shown in FIG. 2A, there are two peaks, referenced 302, having a DOA of approximately 85°, and 304 (having a DOA of approximately 125°). Peak 302 is lower than peak 304, having a likelihood value of just below 50. (The highest peak 304 occurs for a DOA of 125° instead of the correct one of 85°.

FIG. 2B for an angle of 90°, has three peaks, 306, 308 and 310 indicating DOAs of approximately 50°, 90° and 130°, respectively, having likelihood values of approximately 60, 65 and 60, respectively. FIG. 2C for an angle of 95°, has three peaks, 312, 314 and 316 indicating DOAs of approximately 55°, 95° and 135°, respectively, having likelihood values of approximately 55, 55 and 50, respectively.

FIG. 2D for an angle of 100°, has three peaks, referenced 318, 320 and 322 having a likelihood value above 50, indicating DOAs of approximately 55°, 100° and 120°, respectively. In addition, there are three other peaks, referenced 324, 325 and 326, having likelihood values slightly above and slightly below 50 and 60, respectively. In this case, the highest peak 318 occurs for a DOA of 55° instead of the correct one of 100° (peak 320).

FIG. 2E for an angle of 105°, has three peaks, referenced 128, 130 and 132, indicating approximate DOAs of approximately 65°, 105° and 160°, respectively, having likelihood values of approximately 70, 75 and 65, respectively.

FIG. 2F for an angle of 110°, has a peak 334 (likelihood value 55) indicating a DOA of 110°. In addition, there is a second peak, referenced 336, having a likelihood value of approximately 50 indicating a DOA of approximately 75° and a potential third peak 338 indicating a DOA above 170°.

Thus, as illustrated in FIGS. 2A–2F, hereinabove, prior art systems which are based on using the most likely DOA at each measurement point are likely to be confused by similar peaks and even incorrectly calculate the DOA (FIG. 2A and 2D). For the angles of 85°, 95° and 105°, a second peak occurs close to but slightly higher in likelihood value than the correct peak, thus making a correct assessment difficult.

A disadvantage of these prior art techniques is that the direction-of-arrival tracking algorithms cannot handle the frequent, large and non-random errors resulting from operation below the ambiguity threshold.

SUMMARY OF THE INVENTION

An object of the present invention is to provide an improved direction finding system and method for direction of arrival (DOA) tracking of multiple targets including systems which utilize noisy measurements of target signals.

A further object of the invention is to provide a DOA tracking method for tracking targets below the ambiguity threshold.

A yet further object of the invention is to provide a DOA tracking method for tracking multiple targets along the dual axes of azimuth and elevation.

There is thus provided, in accordance with a preferred embodiment of the present invention, a method for direction of arrival (DOA) tracking of at least one source. The method includes the steps of:

selecting all the high peaks from a DOA function as potential track points;

converting the potential track points into a plurality of tracks; and selecting the track having the highest cumulative likelihood value from the plurality of tracks. The source is below the ambiguity threshold.

Additionally, in accordance with a preferred embodiment of the present invention, the method of DOA tracking tracks the source along the azimuth axis. In addition, the method tracks the at least one source along the dual axis of azimuth and elevation.

Furthermore, in accordance with a preferred embodiment of the present invention, the step of converting the potential track points includes the steps of associating the potential track points with active tracks into associated track points. The step of converting further includes the step of using multiple tracking techniques.

Furthermore, in accordance with a preferred embodiment of the present invention, the selecting step comprises the step of selecting the step having the highest cumulative likelihood value.

In addition, in accordance with a preferred embodiment of the present invention, the step of converting the potential track points includes the steps of initialization, confirmation, updating and termination.

Furthermore, in accordance with a preferred embodiment of the present invention, the step of initialization includes the step of initializing a track point which is not associated with any existing track as a tentative track. The step of updating includes the step of updating the associated track points. The step of associating includes the step of associating the tentative track with other non-associated track points into a group of associated track points.

Furthermore, in accordance with a preferred embodiment of the present invention, the step of confirmation includes the step of confirming the track of associated track points if it meets the criteria of having "I" points associated with it out of "J" consecutive attempts, wherein the values of "I" and "J" are pre-determined parameters.

The step of termination includes the step of confirming the track of associated track points does not meet the criteria of having "I" points associated with it out of "J" consecutive attempts, wherein the values of "I" and "J" are pre-determined parameters.

Furthermore, in accordance with a preferred embodiment of the present invention, the step of associating includes the step of associating the potential track points with the updated tracks into an associated peak group.

Furthermore, in accordance with a preferred embodiment of the present invention, the step of updating includes the step of using the past values of the updated track to predict the track position at the next measurement point of the DOA function.

In addition, the step of updating further includes the step of merging every pair of the updated tracks. The step of merging includes the steps of:

calculating the distance between the pair of tracks;

comparing the calculated distance with a pre-determined distance;

if the calculated distance is less than the pre-determined distance, merging the cumulative likelihood of the less likely of the pair of tracks into the more likely of the pair of tracks and deleting the less likely of the pair of tracks; and repeating steps the above steps for the subsequent pair of tracks.

Furthermore, in accordance with a preferred embodiment of the present invention, the step of predicting utilizes a Kalman filter.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
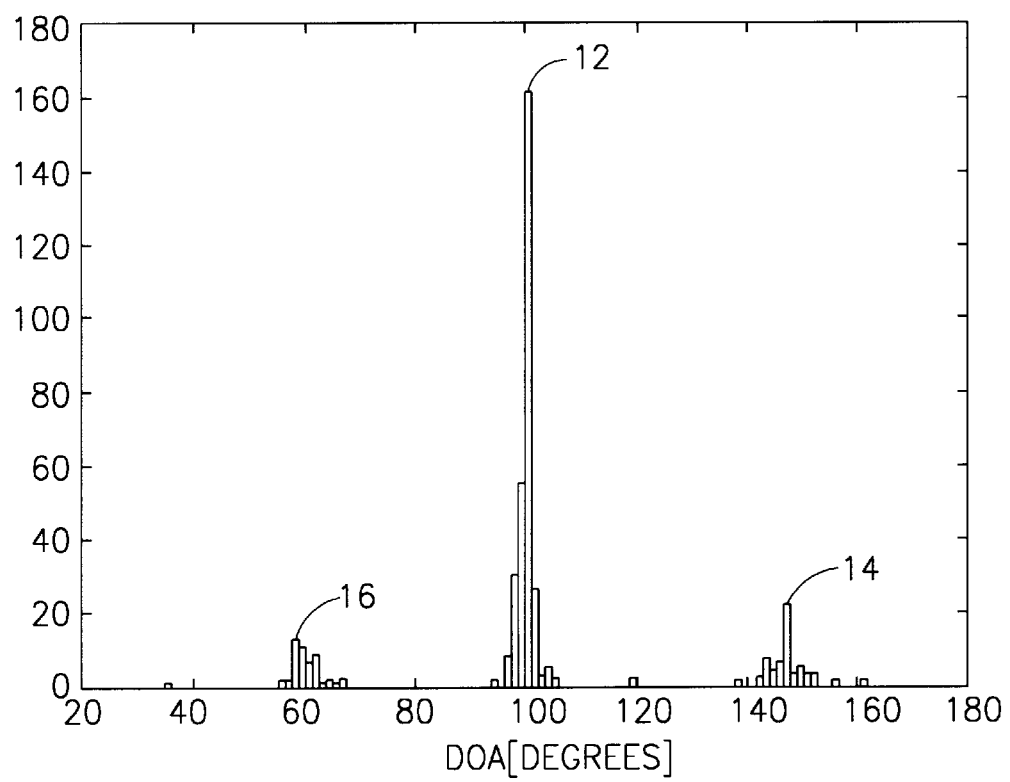
FIG. 1 is a histogram illustration of maximum likelihood estimation results for a single axis DOA tracking of a typical source along the azimuth axis.
Figure 2A:
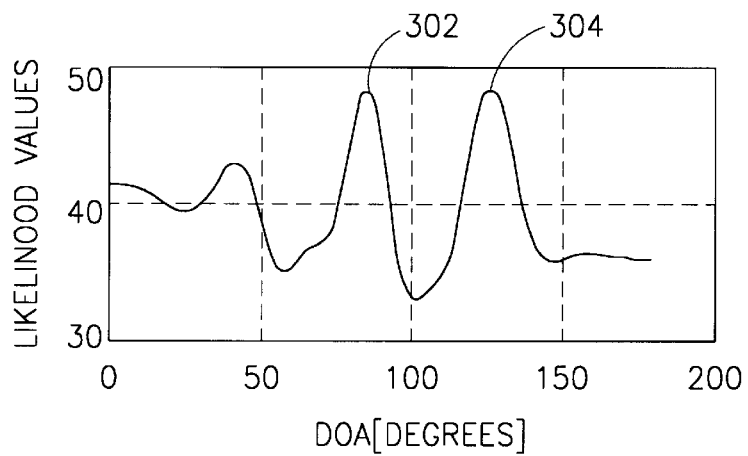
FIGS. 2A–2F are graphical illustrations of the likelihood function $\{L(\theta)\}$ for a single axis source moving between 85 and 110 degrees; along the azimuth axis.
Figure 2B:
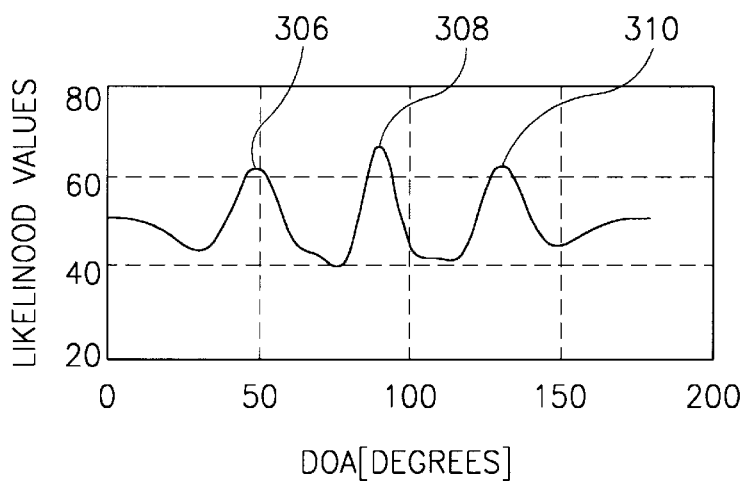
Figure 2C:
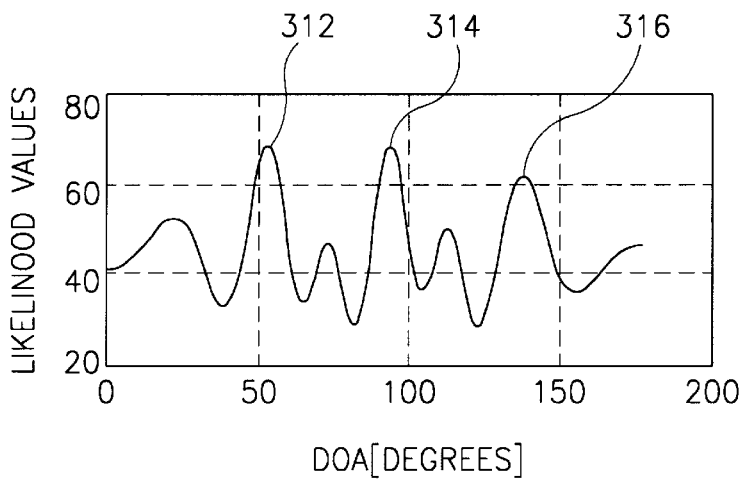
Figure 2D:
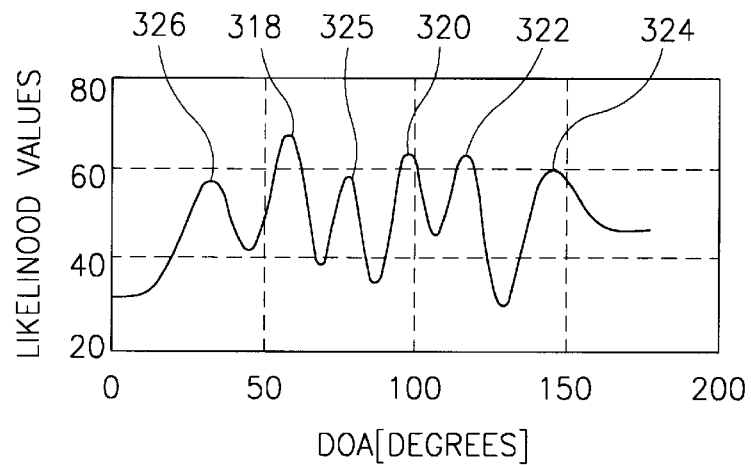
Figure 2E:
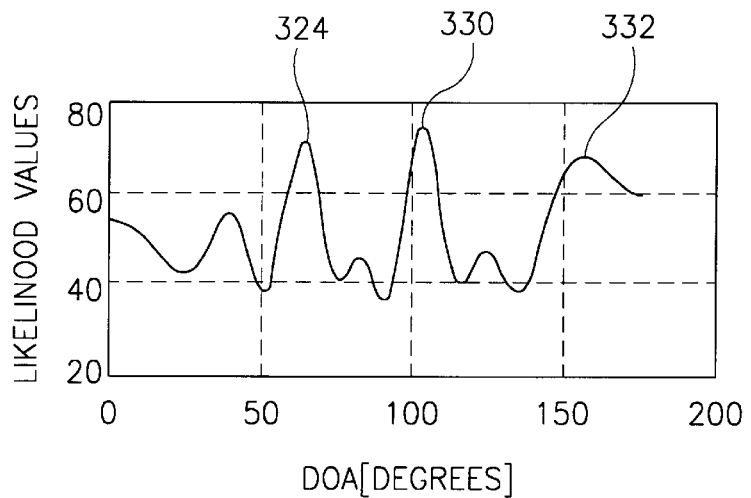
Figure 2F:
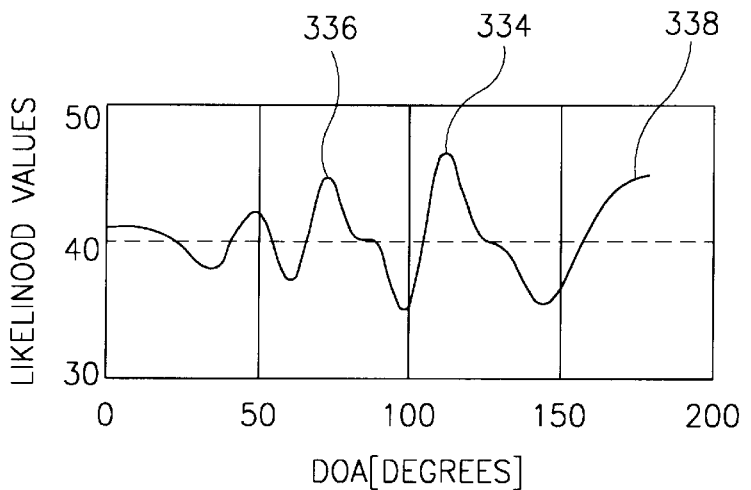

The directions-of arrival (DOA) tracking method of the present invention, which provides for tracking multiple targets, is applicable to a system for tracking multiple targets, including systems which utilize noisy measurements of target signals recorded by an array of sensors. The DOA tracking method is also especially suitable for tracking targets below the ambiguity threshold.

In contrast to prior art tracking systems which are based on using the most likely DOA at each measurement point, the DOA tracking method of the present invention is based on tracking probable DOAs and choosing the most likely track.

For the purposes of example only, the following description relates to a single source moving along the azimuth axis. It will be appreciated by persons skilled in the art that the description of the present invention is not limited to single source but may be extended to multiple sources.

For a moving source emitting a narrowband signal received by an array consisting of ρ sensors.

Using complex envelope notation and assuming that both the source and the sensors are confined to a plane and that the source is in the far-field of the array, the signals received by the array can be expressed by:

$$X(t) = \alpha(\theta(t))s(t) + n(t) \qquad (1)$$

where θ (t) is the DOA of the source, s(t) is the source's signal as received at the reference point, n (t) is the additive noise, and a (θ) is the steering vector towards direction θ, given by:

$$\alpha(\theta) = [\alpha_1(\theta)e^{-jw\tau_1(\theta)}, \ldots, \alpha_p(\theta)e^{-jw\tau_p(\theta)}]^T \qquad (2)$$

where the signal is centered at ω, $a_i(\theta)$ is the amplitude gain of the i-th sensor towards direction θ, and $\tau_i(\theta)$ is the delay of i-th sensor, with respect to the reference point, in receiving a source from direction θ.

Suppose that θ(t) is estimated every T seconds from batches of m samples taken from the array output, and that the source dynamics can be modeled by its angular position θ(t) and angular velocity $\dot{\theta}(t)$ using the following discrete-time, constant velocity state space model:

$$y(k+1) = Fy(k) + w(k)$$
$$\hat{\theta}(k) = Hy(k) + v(k) \qquad (3)$$

where $y(k) = [\theta(kT), \dot{\theta}(kT)]^T$ is the state vector, θ(k) is the estimated DOA of the source, w(k) and v(k) are the process and measurement noise, respectively, and F and H are state transition matrix and measurement matrix, respectively, given by $$F = \begin{bmatrix} 1 & T \\ 0 & 1 \end{bmatrix} \qquad (4)$$

$$H = [1 \quad 0].$$

In order to estimate the DOA track θ(t), given the data batches, the following assumptions are made.

A1: The change in the DOA of the source during the batch time is negligible.

A2: The change in the DOA of the source between consecutive batches is small. e.g. θ(kT)≈θ((k+1)T).

A3. The emitted signal s(t) is an unknown and arbitrary waveform.

A4. The additive noise samples {n(t_i)} are i.i.d Gaussian complex random vectors with zero mean and covariance $\sigma^2 I$, where $\sigma^2$ is unknown.

A5: The process noise w(k) is Gaussian distributed with zero mean and covariance matrix $$Q = r \begin{bmatrix} \frac{1}{3}T^3 & \frac{1}{2}T^2 \\ \frac{1}{2}T^2 & T \end{bmatrix}, \qquad (5)$$

where r is a known constant representing the acceleration variance.

A6: The measurement noise v(k) is Gaussian distributed with zero mean and unknown variance $\sigma^2(k,\theta)$.

A1 insures an unbiased DOA measurement. A2 insures proper tracking initialization; simulation results show that half beamwidth difference between consecutive directions-of-arrival suffices. It should be pointed out that once a track has been initialized, a use of a Kalman filter, to be described later, allows more than half beamwidth difference between consecutive directions-of-arrival. A3 and A4 are not critical but are included to simplify the optimal DOA estimator. A5 is common in modeling of dynamic systems. A6 is plausible, recalling that the measurement noise is actually the DOA estimation error.

Figure 3:
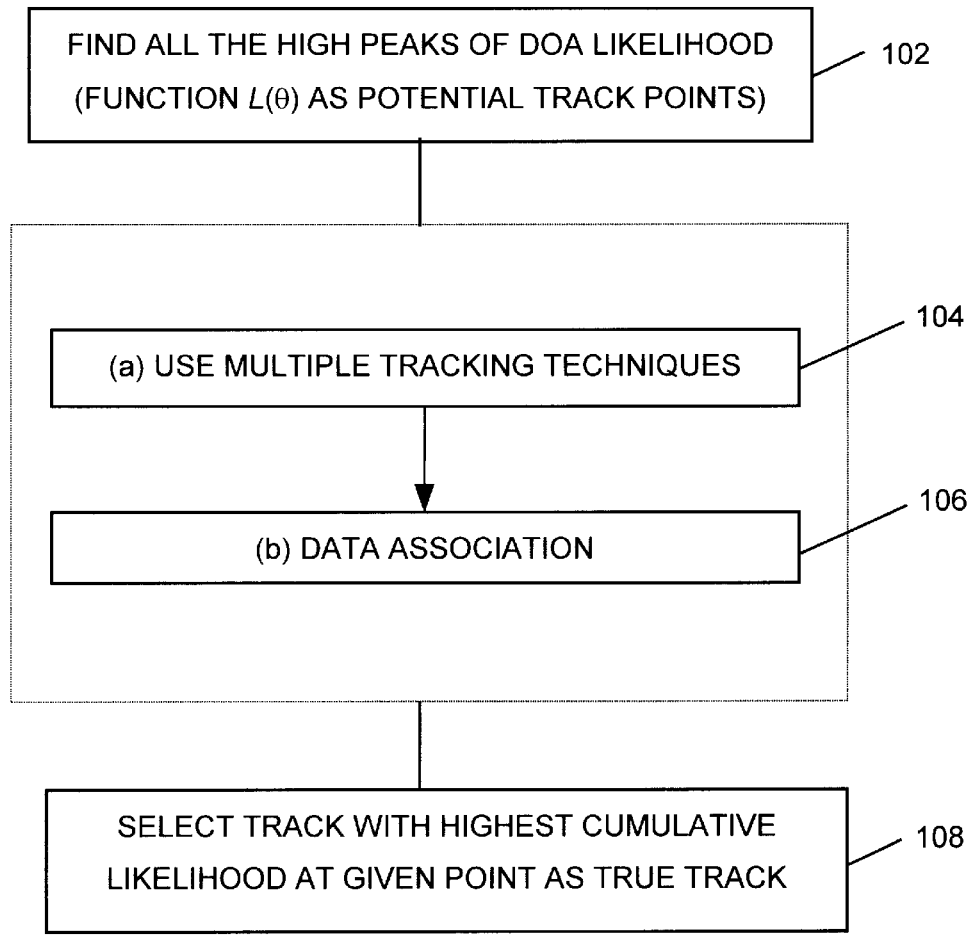
FIG. 3 is a schematic flow chart illustration of the DOA tracking method of a single axis source along the azimuth axis according to a preferred embodiment of the present invention.

The method for DOA tracking below the ambiguity threshold, in accordance with a preferred embodiment of the present invention, is illustrated by the high level flow chart of FIG. 3, to which reference is now made. All the peaks of the DOA likelihood function L(θ) are considered, that is, all the potential directions-of-arrival are regarded as potential track points. Firstly, the peaks of the likelihood function are found (step 102). Then using multiple target tracking techniques (step 104) together with data association (step 106), tracks are formed and the track having the highest cumulative likelihood at given point is selected as the true track for that point (step 108).

All the peaks of the likelihood function L(θ) which are selected as potential track points (step 102) can be defined as the set Θ of points obeying the following equation:

$$\Theta = \{\theta : \dot{L}(\theta) = 0, \ddot{L}(\theta) < 0\} \qquad (6)$$

Alternatively, the number of peaks can be limited to peaks which are ΔdB below the value of the global maximum. Δ is a design parameter determined from the ambiguity structure and the field of view. The set Θ is computed by the Roller-coaster algorithm or any other similar procedure.

Assuming that at time instance k, the number of peaks while are selected as potential track points is N(k), we denote the likelihood peaks values as $\{L(\theta_i)_{i=1}^{N(k)}$, where $\theta_i \in \Theta$ and is the location of the $i^{th}$ peak of L(θ). L(θ) is computed using the following equation (7), for a batch consisting of m samples:

$$L(\theta) = \frac{a^H(\theta)\hat{R}a(\theta)}{a^H(\theta)a(\theta)} \qquad (7)$$

where $\hat{R}$ is the sample-covariance matrix of the batch:

$$\hat{R} = \frac{1}{m}\sum_{i=1}^{m} x(t_i)x^H(t_i) \qquad (8)$$

The peaks of L(θ) represent the most likely DOA for a given batch. Above the ambiguity threshold, the highest peak represents the most likely DOA. However, as described hereinabove with references to FIGS. 2A–2F, below the ambiguity threshold, the height of the ambiguous peaks rise and occasionally exceed the height of the peak corresponding to the true DOA.

Figure 4:
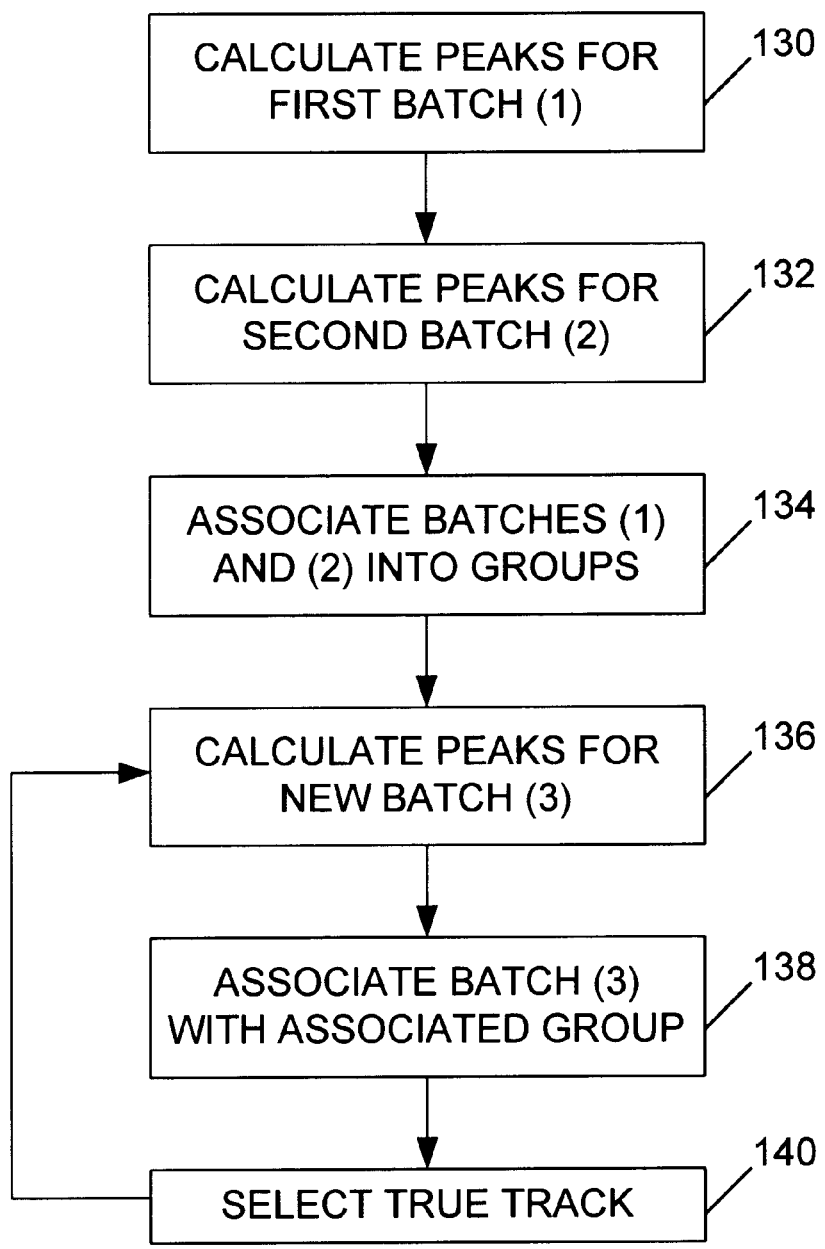
FIG. 4 is a more detailed flow chart illustration of the step of selecting the most likely track.

Reference is now also made to FIG. 4 which is more detailed flow chart illustration of the steps of selecting the most likely track (step 108).

The peaks or a first batch of samples are calculated (step 130). The peaks for a second batch of samples are then calculated (step 132).

The peaks from these two batches are associated into groups (step 134). The peaks for each new batch of samples are then calculated (step 136) and associated (step 138) with the existing associated group (from step 134), Which is updated with each additional peak. The associated groups form tracks and the track having the highest cumulative likelihood is selected as a true track (step 140).

Steps 136–140 are repeated for each subsequent batch of samples.

Figure 5:
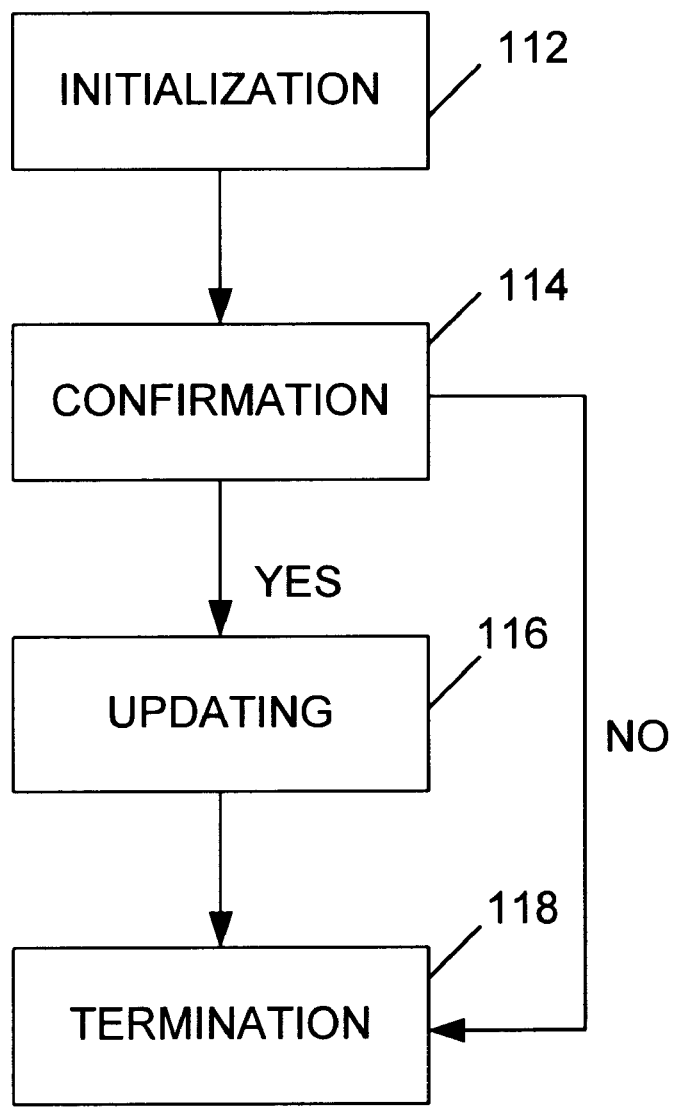
FIG. 5 is a high level block diagram of the track life cycle of the method of FIG. 3.

The track life cycle (of tracking (step 104) and association (step 106)) consists of four stages, illustrated in the high level block diagram of FIG. 5 to which reference is now made. The stages of may be summarized as initialization (step 112), confirmation (step 114), updating (step 116) and termination (step 118).

A track is initialized (step 112) for a track point which is not associated with any existing track. After initialization, this track is considered as a tentative track. Until termination (step 118), for every new set of potential track points, the tentative and confirmed track points are updated (step 116) using the data association algorithm (step 106), to be described in detail hereinbelow.

Figure 6:
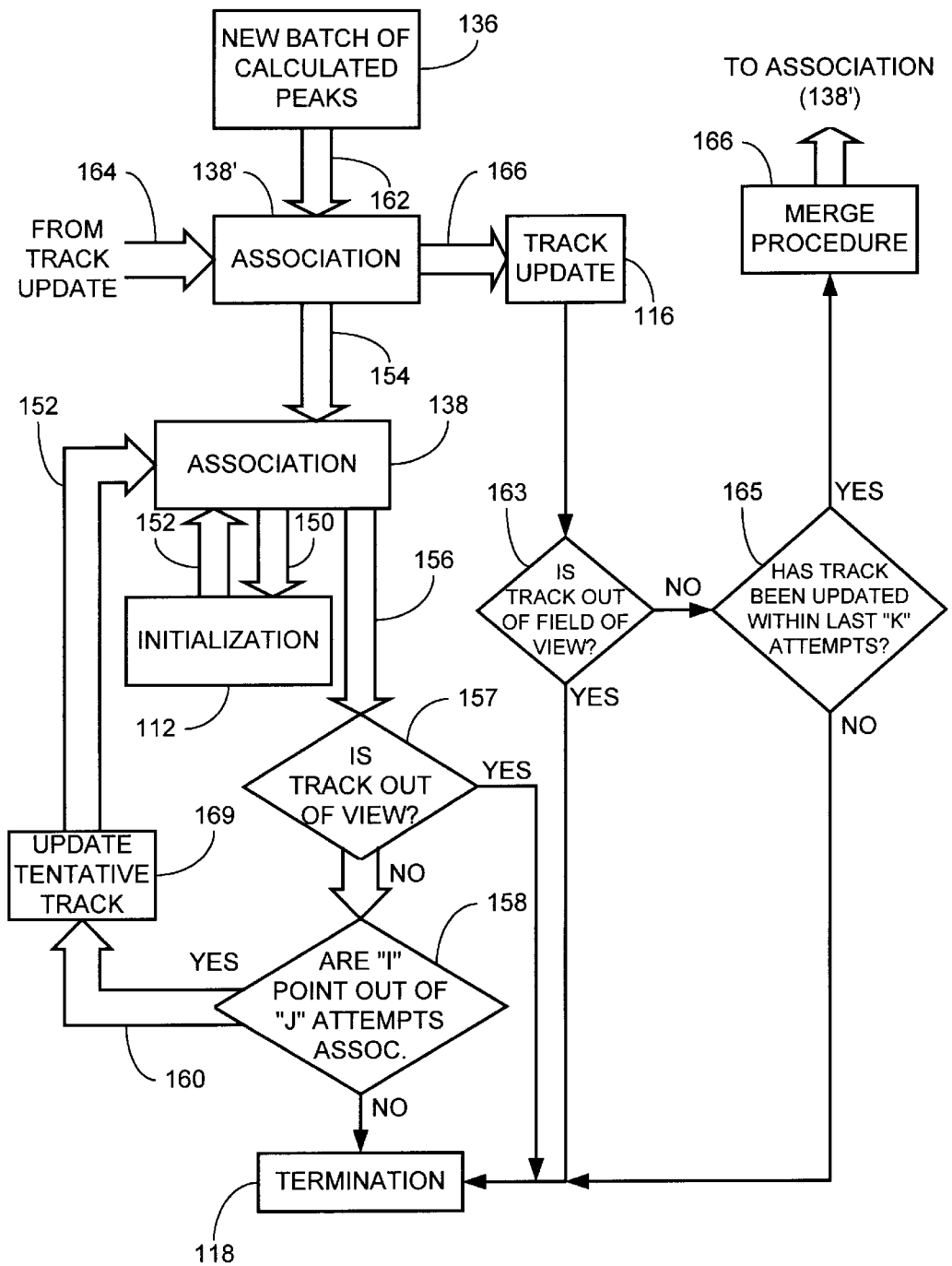
FIG. 6 is a detailed block diagram illustration of the relationship between the various stages of the track life cycle of FIG. 5.

Reference is now made to FIG. 6 which is a detailed block diagram illustration of the relationship between the various stages of the track life cycle. A non-associated peak (or track point) (arrow 150) is initialized (step 112) and is considered as a tentative track (arrow 152). Tentative tracks 152 are associated (step 138) with other non-associated peaks (arrow 154) in order to try to associate them into an associated peak group (arrow 156).

This new tentative track (that is, including associated peak 156) is then checked (query box 157) to determine whether the track is outside the field of view (FoV). If the track is outside, the tentative track is terminated (step 118).

If the track is inside the field of view (FoV) the track is checked (query box 158) to determine whether it meets the criteria of having "I" points associated with it out of "J" consecutive attempts. The values of "I" and "J" are pre-determined parameters. If the criteria are met, the tentative track (arrow 160) is confirmed (step 114). The confirmed track is then updated (step 116).

If the query box 158 criteria are not met, the tentative track is terminated (step 118).

For each new batch of samples, for which the peaks are calculated (step 136), the new peaks (arrow 162) are then associated (step 138') with the updated tracks (arrow 164). As a result of this association (step 138'), associated peaks (arrow 166) are updated (step 116), while the non-associated peaks (arrow 154) are associated (step 138) with the tentative tracks (arrow 152), as described above.

Tracks are not updated in the following situations:
(i) If there are more tracks than potential track points This situation may occur since the number of peaks of the likelihood function L(θ) depends on the source DOA and hence may vary.
(ii) If data association does not take place because the association is considered by the algorithm to be 'unlikely'.

After the track is updated (step 116), the updated track is again checked (query box 163) to determine whether the track is outside the field of view (FoV). If the track is outside, the tentative track is terminated (step 118). Furthermore, if a track is not updated during 'K' consecutive attempts (box 165) (K being a pre-determined parameter), the track is also terminated (step 118) A track (which has not been terminated) is then merged (step 166). The merge procedure is described hereinbelow with reference to FIG. 6A.

While track is updated (step 116), its past values are used to predict, via a Kalman filter or similar procedure, the track position at the next measurement point. This predicted position (tentative or confirmed) is then used in the data association (138') and in filtering the DOA track. If a point was not associated to a track its predicted position is used as an associated point.

The Kalman filter equations are given by the following:

$$\hat{y}(k|k) = \hat{y}(k|k-1) + K(k)[\theta(k) - H\hat{y}(k|k-1)] \quad (9)$$

$$K(k) = P(k|k-1)H^T[HP(k|k-1)H^T + \sigma^2(k,\theta)]^{-1} \quad (10)$$

$$P(k|k) = [I - K(k)H]P(k|k-1) \quad (11)$$

$$\hat{y}(k+1|k) = F\hat{y}(k|k) \quad (12)$$

$$P(k+1|k) = FP(k|k)F^T + Q \quad (13)$$

where:

$\hat{y}(k|k-1)$ is the predicted value of $\hat{y}(k)$ based on the DOA estimates up to time (k−1)T.

$P(k|k-1)$ is the covariance matrix of the prediction error $\hat{y}(k) - \hat{y}(k|k-1)$.

$\hat{y}(k|k)$ is the filtered estimate of y(k) based on the DOA estimates up to time kT.

$P(k|k)$ is the covariance matrix of the filtered error $y(k) - \hat{y}(k|k)$.

The measurement noise variance $\sigma^2(k,\theta)$ is estimated, in order to carry out the recursions. If the number of samples per batch m is large enough, $\sigma^2(k,\theta)$ can be approximated by the known Cramer-Rao bound since it is relatively tight bound for these ambiguity-free tracks. The estimated measurement variance is denoted as $\hat{\sigma}^2(k,\theta)$.

To initialize the Kalman filter the first two track points, $\theta(1), \theta(2)$, are used:

$$\hat{y}(2|2) = \left[ \breve{\theta}(2), \frac{(\breve{\theta}(2) - \breve{\theta}(1))}{T} \right]^T \quad (14)$$

$$P(2|2) = \bar{\sigma}^2 \begin{bmatrix} 1 & 1/T \\ 1/T & 2/T^2 \end{bmatrix}$$

where $$\bar{\sigma}^2 = \frac{\hat{\sigma}^2(1, \breve{\theta}(1)) + \hat{\sigma}^2(2, \breve{\theta}(2))}{2}$$

Figure 6A:
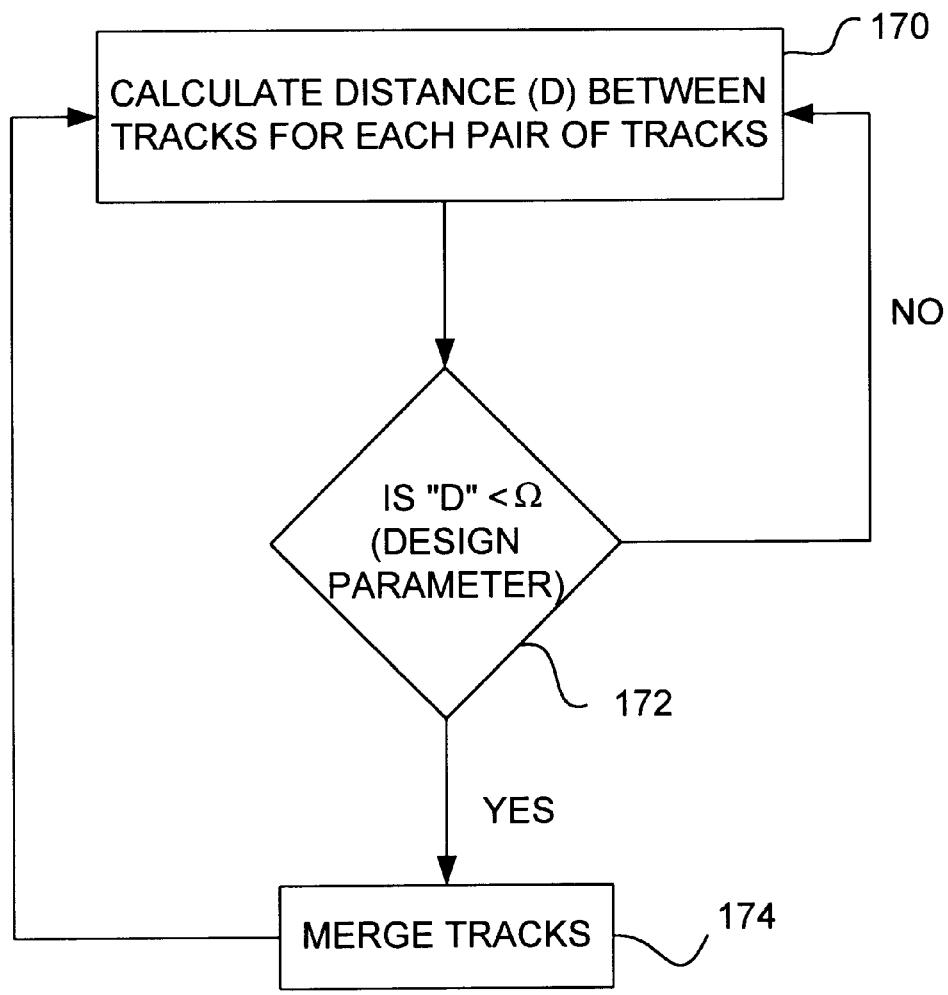
FIG. 6A is a schematic flow chart illustration of the merge function of the track life cycle.

Reference is now made to FIG. 6A which is a flow chart illustration of the step of merging tracks (step 166). For every pair of tracks, a merge procedure loop is performed, as follows:

For $\{T_i(k)\}_{i=1}^{M(k)}$ and $\{T_j(k)\}_{j=1}^{M(k)}$, where $i,j \in [1, M(k)]; i > j$ the distance between the tracks is calculated (step 170) as follows:

For Az only:

$$D_{AZ}(T_i, T_j) = |\hat{\theta}_i(k|k) - \theta_j(k|k)|$$

The calculated $D_{AZ}$ is then compared with the design parameter $\Omega_{AC}$ (step 172).

If the distance between the pair of tracks is within the design tolerance:

$D_{AZ}(T_i, T_j) < \Omega_{AZ}$, the two tracks $(T_i, T_j)$ are merged (step 174). Then the merge procedure is repeated (steps 170–174) for every subsequent pair within the set of tracks.

If the distance between the pair of tracks is outside the design tolerance, merging does not take place and the merge procedure is repeated (steps 170–174) for the next pair within the set of tracks.

The merge procedure is as follows:

If the cumulative likelihood of "i" is greater than for "j" ($L_i(k) > L_j(k)$), then "j" is merged into "i" and "j" deleted. Otherwise, "i" is merged into "j" and "i" deleted.

The merge process differs depending on whether track "i" is tentative or not. If track "i" is tentative, the track "j" is updated (see step 116 above) as a "new point" taking the location of "i";, $\{\hat{\theta}_i(k|k); \hat{\phi}_i(k|k)\}$ and value $L_i(k)$.

If track "i" is not tentative, the track "j" is updated as follows:

$$\hat{\theta}_j(k|k) = \frac{\hat{\theta}_j(k|k) + \hat{\theta}_i(k|k)}{2} \qquad (15)$$

$$\hat{\phi}_j(k|k) = \frac{\hat{\phi}_j(k|k) + \hat{\phi}_i(k|k)}{2}$$

Data association (106) associates potential track points with the active tracks. Association is needed because the location and the height of the likelihood peaks can change substantially between consecutive DOA estimates below the ambiguity threshold.

The data association problem is not complicated by tracks which cross, as in conventional multi-target tracking. Furthermore, track separation is governed by the array beamwidth, thereby simplifying the data association problem.

For the purposes of describing the data association procedure (see FIG. 5), let $$\{\breve{\theta}_j(k)\}_{j=1}^{N(k)}$$

denote the newly generated set of N(k) potential track points at time kT, each with its corresponding likelihood value $$L(\breve{\theta}_j(k)).$$

Also, let $\{T_i(k)\}_{i=1}^{M(k)}$, denote the set of active tracks at time kT, each with its cumulative likelihood valve $\{L_i(k)\}_{i=1}^{M(k)}$ given by $$L_i(k) = L_i(k-1) + L(\breve{\theta}_i(k)), \qquad (16)$$

its predicted state vector $\{y_i(k|k-1)\}_{i=1}^{M(k)}$, given by:

$$\hat{y}_i(k|k-1) = [\hat{\theta}_i(k|k-1), \hat{\dot{\theta}}_i(k|k-1)]^T, \qquad (17)$$

and its measurement prediction variance $\{s_i(k)\}_{i=1}^{M(k)}$, given by:

$$s_1(k) = E[e^2(k)] = HP_i(k|k-1)H^T + \hat{\sigma}^2(k, \hat{\theta}_i(k|k-1)) \qquad (18)$$

where $E[e^2(k)]$ denotes statistical expectation and $$e(k) = \breve{\theta}(k) - H\hat{y}_i(k|k-1). \qquad (19)$$

The present invention solution to the association problem is based on probabilistic modeling of the association process and on using the maximum a-posteriori criterion as a selection rule.

Let $p_i(k|T_i(k))$ denote the a-priori probability that the i-th track be updated by a new track point at time kT. Regarding the cumulative likelihood score $L_i(k)$ as representing this a-priori probability, a natural estimator for $p_i(k|T_i(k))$ is given by $$\hat{p}_i(k|T_i(k)) = \frac{L_i(k)}{\sum_{n=1}^{M(k)} L_n(k)} \qquad (20)$$

Let $d_{ij}(k)$ denote the angular distance between the point $\breve{\theta}_j(k)$ to the i-th track predicted position, $\hat{\theta}_i(k|k-1)$, and let A(k) denote the true association between the existing tracks $\{T_i(k)\}_{i=1}^{M(k)}$ and the points $$\{\breve{\theta}_j(k)\}_{j=1}^{N(k)}.$$

Conditioned on a true association, $\{d_{ij}(k)\}$ can be modeled as independent and zero mean Gaussian random variables with variance $s_i(k)$. That is, the probability density of $\{d_{ij}(k)\}$ is given by:

$$p(\{d_{ij}(k)\}|A(k), \{T_i(k)\}_{i=1}^{M(k)}) = \prod_{(i,j) \in A(k)} \frac{1}{\sqrt{2\pi s_i(k)}} \exp\left(\frac{-d_{ij}^2(k)}{2s_i(k)}\right). \qquad (21)$$

Now, using Bayes' rule, the probability of A(k) is given by:

$$p(A(k)|\{d_{ij}(k)\}, \{T_i(k)\}_{i=1}^{M(k)}) = \prod_{(ij) \in A(k)} \frac{1}{2\pi s_i(k)} \exp\left(\frac{-d_{ij}^2(k)}{2s_i(k)}\right) p_i(k|T_i(k)) \qquad (22)$$

According to the maximum a-posteriori criterion, the most probable association is the one that maximizes (22) over all potential associations, i.e., $$\max_{\{A_l(k)\}_{l=1}^{P(k)}} p(A_l(k)|\{d_{ij}(k)\}, \{T_i(k)\}_{i=1}^{M(k)}), \qquad (23)$$

where $\{A_l(k)\}_{l=1}^{P(k)}$ denotes the set of all potential associations. Here, P(K) denotes the cardinality of the set and is given by $$P(K) = \frac{q(k)!}{(q(k)-p(k))!}$$

with, $q(k) = \max(M(k), N(k))$. This amounts, after taking the logarithm, to the minimization of the following criterion:

$$\min_{\{A_l\}_{l=1}^{P(k)}} \sum_{(i,j) \in A_l} D_{ij}(k), \qquad (24)$$

where $$D_{ij}(k) = \frac{d_{ij}^2(k)}{s_i(k)} + \log(s_i(k)) - 2\log(\hat{p}_i(k|T_i(k))). \qquad (25)$$

An efficient minimization of Equation (24) over all possible associations is offered by the Munkres algorithm.

Let $\{(i_n^*, j_n^*)\}_{n=1}^{P(k)}$ denote the set of point-track pairs that minimize (according to equation 24) and let their corresponding distances be denoted by $\{D_{i_n^* j_n^*}(k)\}_{n=1}^{P(k)}$.

If $D_{i_n^* j_n^*}(k) \le \gamma$, where $\gamma$ is a threshold design parameter, the $j_n^*$-th input point is associated to the $i_n^*$-th track, and its likelihood score, $L(\theta_{j_n^*})$, is added to the track score. When $D_{i_n^* j_n^*}(k) > \gamma$ the input point is not likely to belong to a track, and thus is used to initiate a new track.

The association procedure described hereinabove is applicable when the prediction covariance, $s_i(k)$, is available. Newly initialized tracks, that is tracks with only one point, lack this information. In order to associate a second point to an initiated track, the association distance is computed by $D_{ij}(k)=d_{ij}^2(k)$ and the association is performed using the array beamwidth as the threshold parameter $\gamma$.

Figure 7:
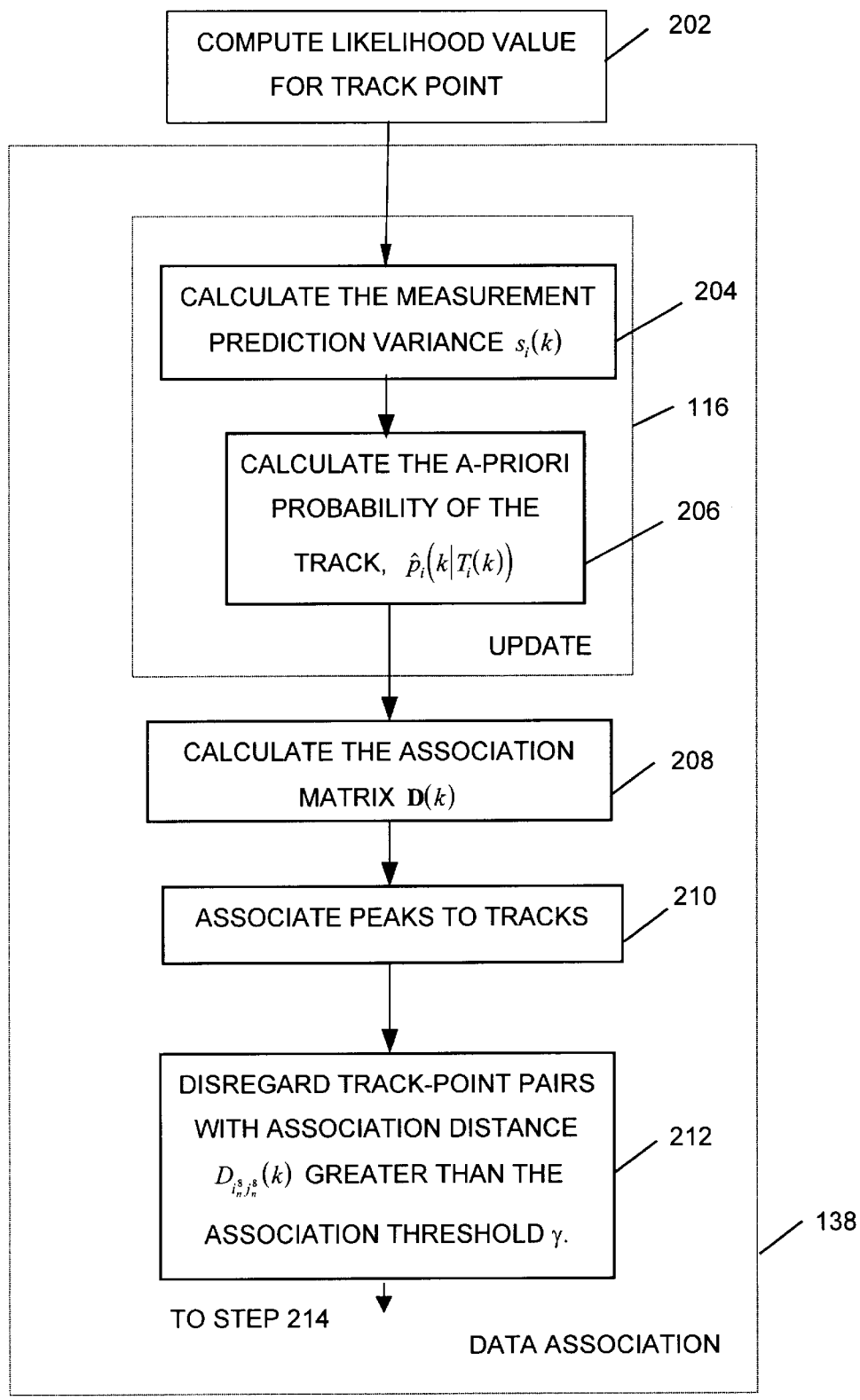
FIGS. 7 and 7A are schematic flow chart illustrations of the method of data association.
Figure 7A:
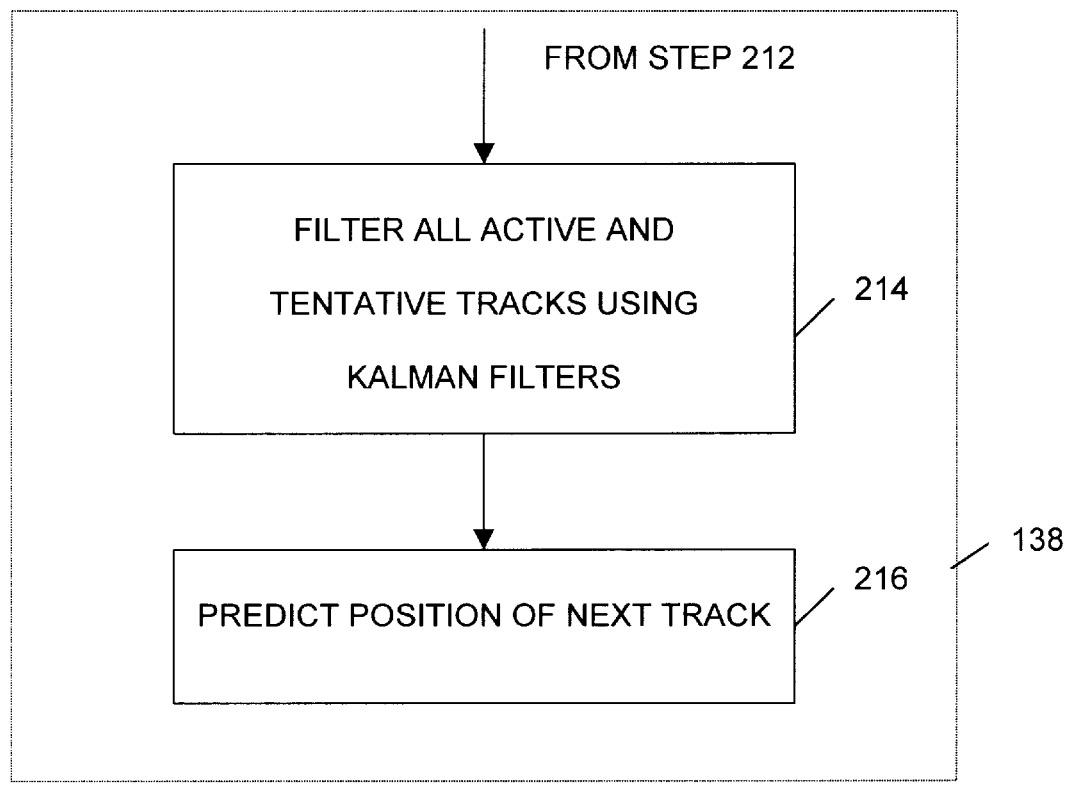

Reference is now made to FIGS. 7 and 7A which are schematic flow chart illustrations of the method of data association (step 138).

At every time kT, given a set of tracks $\{T_i(k)\}_{i=1}^{M(k)}$ and a new batch $\{x(t_i)\}_{i=1}^m$, the location of the potential track points $$\{\check{\theta}_i(k)\}_{i=1}^{N(k)}$$

and their likelihood value $$\{L(\check{\theta}_i)\}_{i=1}^{N(k)}$$

are computed using Equations (6) and (7) respectively (step 202).

For every track $T_i(k)$, the following update steps (116-FIG. 5) are repeated:

a) The measurement prediction variance $s_i(k)$ using Equation (17) (step 204) is calculated.

b) The a-priori probability of the track, $\hat{p}_i(k|T_i(k))$ using Equation (19) (step 206) is calculated.

The association matrix D(k) is then calculated using Equation (24) (step 208).

Peaks are associated to tracks by minimizing Equation (20), using the Munkres algorithm (step 210).

Track-point pairs with association distance $D_{i_n^* j_n^*}(k)$ greater than the association threshold $\gamma$ are disregarded (step 212).

As described hereinabove with respect to FIGS. 6 and 6A, tracks with K consecutive association failures are terminated (step 118). New tracks are Initiated using the non-associated potential track points. Tentative tracks are confirmed (step 114) or terminated (step 118) using I-out-of-J rule (query box 158). All active and tentative tracks are filtered (step 214) using Kalman filter equations (9)–(13) and the position of the next track predicted (step 216). If the point was not associated to a track, it's predicted position is used as an associated point.

After the completion of the data association step (106), the most likely track $\hat{i}(k)$, is determined (step 108), using equation (25). The cumulative likelihood score is used and the track having the maximized score is selected. That is:

$$\hat{i}(k) = \arg\max(L_i(k)), i=1, \ldots, M(k) \quad (26)$$

Given the most likely track, $\hat{i}(k)$, the most likely DOA at time kT, is given by the filtered position of the best track, $\hat{\theta}_{\hat{i}(k)}(k|k)$.

The following examples compare the performance of the DOA tracking method of the present invention with the prior art DML estimator using different arrays.

In each experiment a set of 100 Monte Carlo runs were carried out and the DOA was estimated using both methods. In all runs the source angular velocity was $$0.5 \frac{o}{\sec},$$

the acceleration variance r was $$0.15 \frac{o}{\sec^2},$$

the track length was 200 seconds and the direction finding was done every T=1 seconds. The first 30 seconds of each track were considered as an initialization period and were excluded from the performance comparison.

The percentage of ambiguous DOA in each run were recorded and their mean computed for the whole set. An estimated DOA was declared as ambiguous if it was not the closest peak to the true direction.

EXAMPLE 1

Figure 8A:
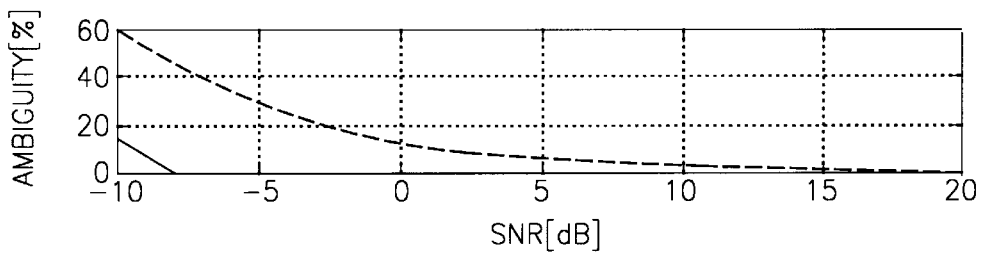
FIGS. 8A–8C are graphical illustrations of the comparative performance of the DOA tracking method of the present invention with the prior art DML estimator for a three element linear array.
Figure 8B:
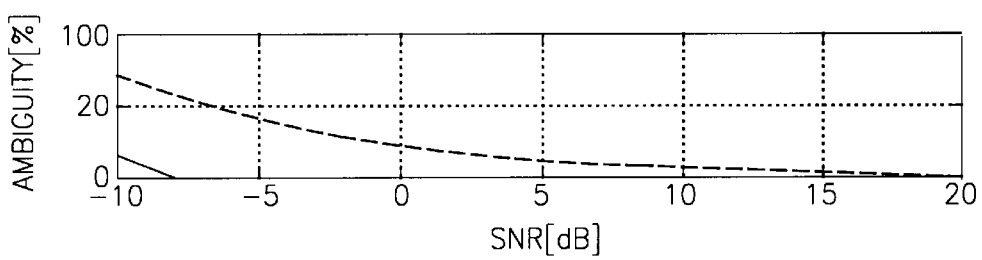
Figure 8C:
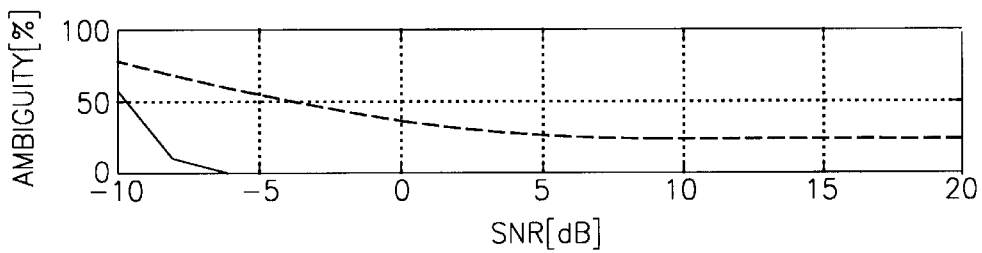

FIGS. 8A–8C illustrate the ambiguity percentage results as a function of the SNR for a sparse and ambiguity-prone three-element linear array with inter-element spacing ratio of 3:4 and a field of view of ±85° from boresight, m=100 snapshots per batch and array apertures of 2$\lambda$, 4$\lambda$, 8$\alpha$, respectively. The design parameters were $\Delta$=0.6 dB, K=5, I=2, J=2 and $\gamma$=20.85.

The DML algorithm is shown as a dashed line and the DOA tracking algorithm of the invention is shown as a solid line.

It should be noted that while in the conventional approach the probability of ambiguity rises with the aperture size and is high even at very high SNR, using the DOA tracking method of the invention the probability of ambiguity is essentially independent of the aperture and starts rising only at −8 dB, which is the no-information threshold for this problem.

Figure 9:
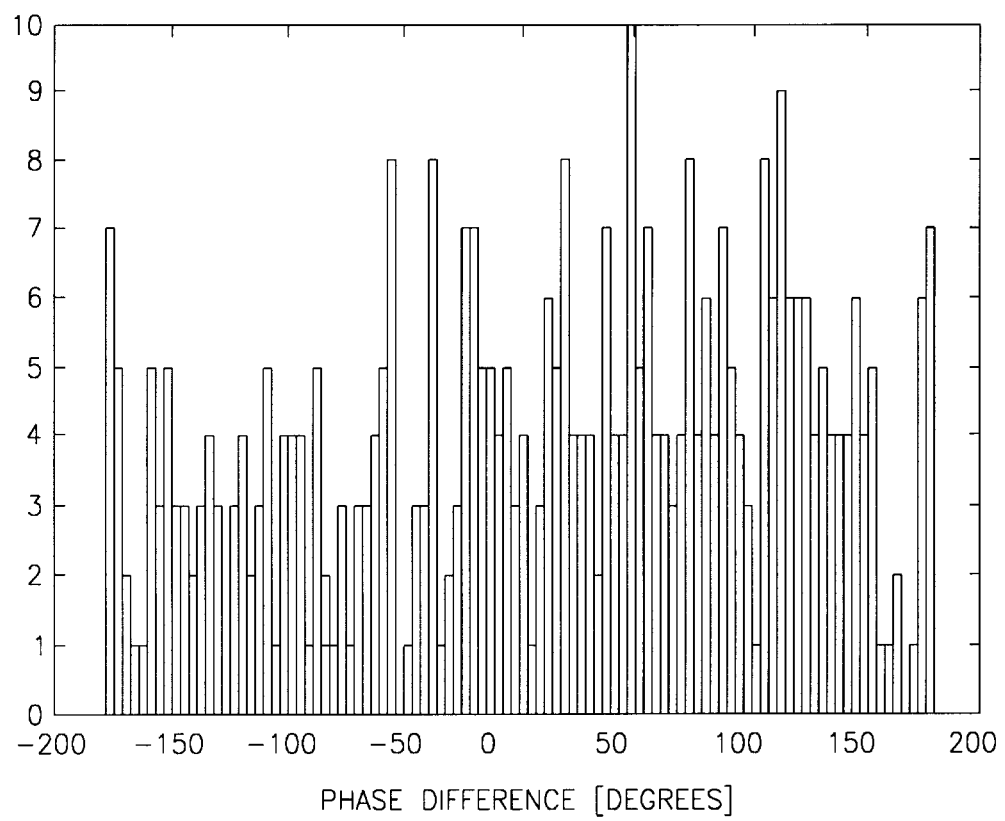
FIG. 9 illustrates in histogram form the phase-difference of the sensor pair of FIG. 8A.

FIG. 9 illustrates in histogram form the phase-difference of the first sensor pair of the 4$\lambda$ array for DOA 100° at this SNR, though centered at the nominal value, 53.5°, is very close to being uniform. 400 batches were used, each calculated using 100 samples of the array output with SNR=−8 dB.

Figure 10A:
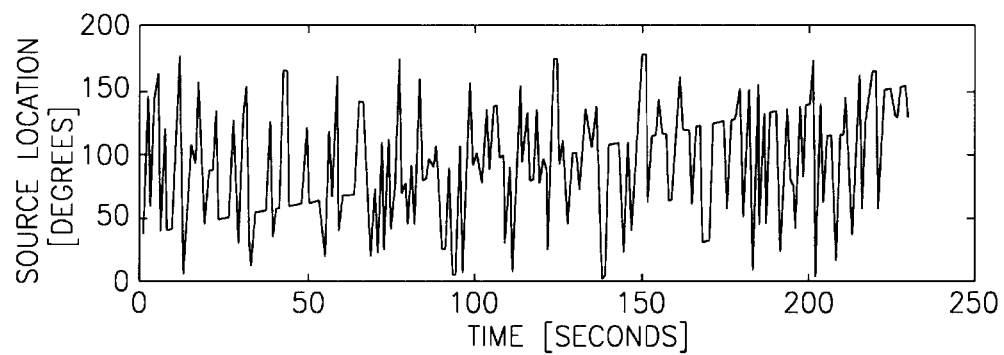
FIGS. 10A and 10B are graphical illustrations of the comparative performance of the DOA tracking method of the present invention and the prior art DML estimator, respectively, for a three element linear array.
Figure 10B:
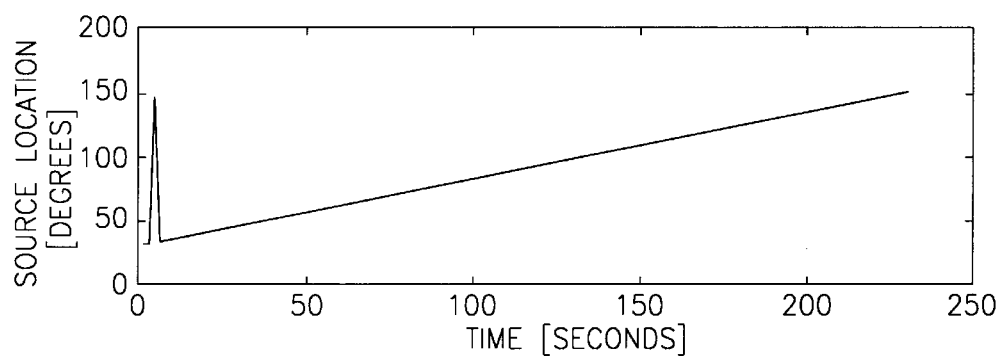

FIGS. 10A and 10B illustrates a typical track estimation result for aperture 8$\lambda$ and SNR of −6 dB for both methods. Note that the ambiguity-rich track obtained in the conventional method (FIG. 10A) contrasted with the ambiguity-free track obtained using the DOA tracking method (FIG. 10B). A three-element linear array with inter-element spacing ratio of 3:4 and aperture of 8$\lambda$ was used. Track length is 230 seconds, with DOA estimation done every 1 second, using 100 samples of the array output. SNR is −6 dB. The only ambiguity errors occurred during the third and the fourth seconds, within the 30 seconds initialization period.

EXAMPLE 2

Figure 11A:
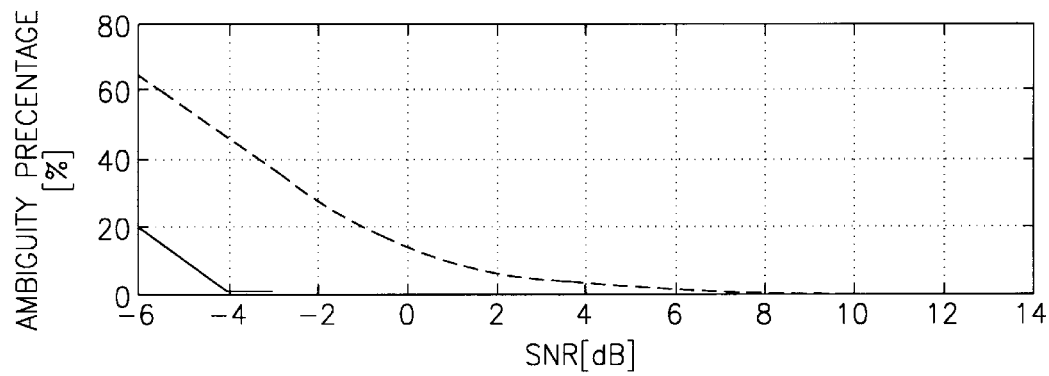
FIGS. 11A–11B are graphical illustrations of the comparative performance of the DOA tracking method of the present invention and the prior art DML estimator for a 5-element uniform circular array with an aperture $8\lambda$.
Figure 11B:
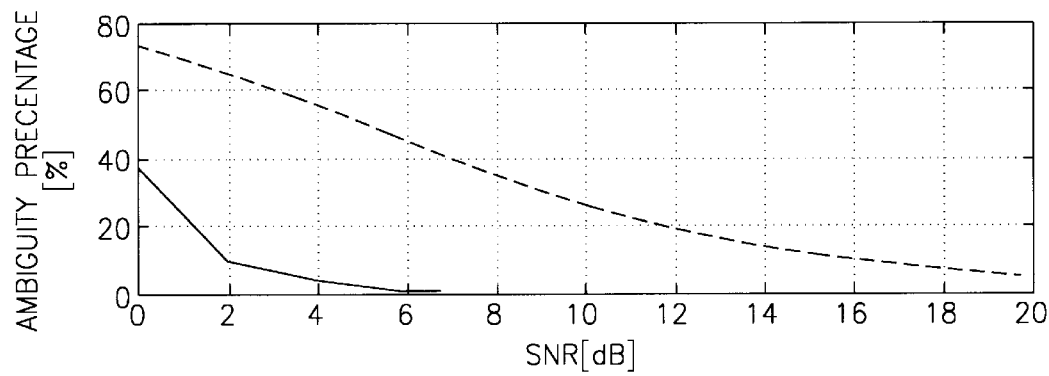

In the second set of experiments illustrated in FIGS. 11A–11B the performance for a 5-element uniform circular array with aperture 8$\lambda$ is shown. This array is also sparse and ambiguity-prone but has circular symmetry. The field of view was taken as 360°. The design parameters were $\Delta$=1 dB, K=10, I=3, J=3 and $\gamma$=20.85. The ambiguity percentage results as a function of the SNR for m=10 and m=1 snapshots are shown in FIGS. 11A and 11B respectively. The DML algorithm is shown as a dashed line and the DOA tracking algorithm of the invention is shown as a solid line.

Note that while the difference between the threshold of the two methods is 10 dB for m=10, it is more then 14 dB for m=1, implying, as in the example of FIGS. 8A–8C, that the harder the scenario the higher the performance gain.

EXAMPLE 3

Figure 12A:
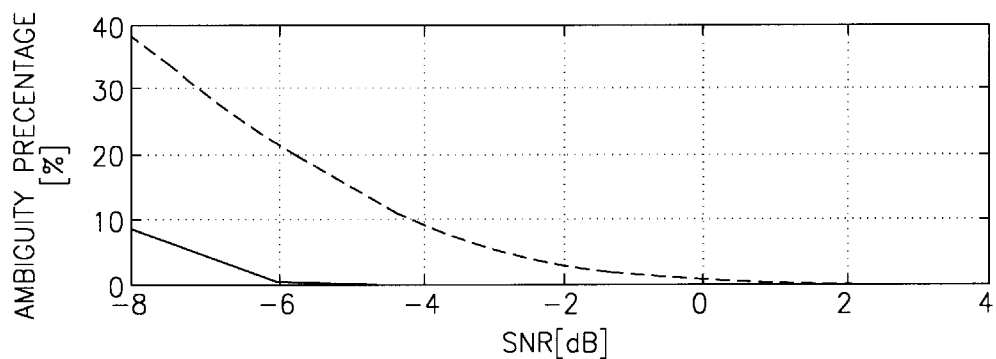
FIGS. 12A–12B are graphical illustrations of the comparative performance of the DOA tracking method of the present invention and the prior art DML estimator for a 5-element uniform linear array (ULA) with element spacing of half-wavelength.
Figure 12B:
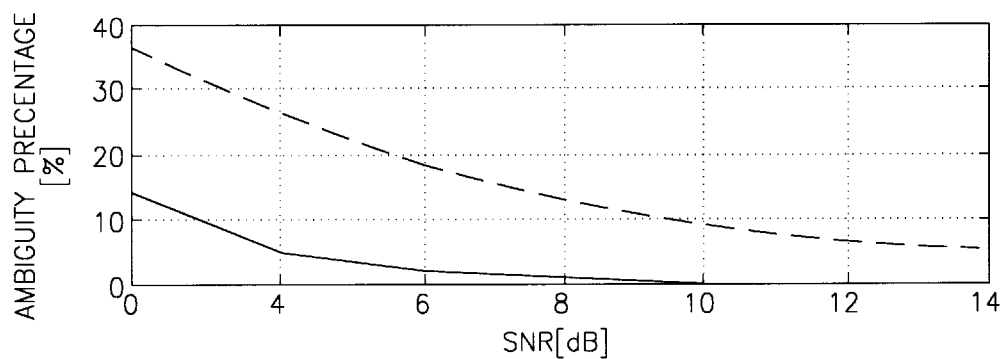

In the third set of experiments (FIGS. 12A and 12B) demonstrate the performance for a 5-element uniform linear array (ULA) with element spacing of half-wavelength. Note that this array, unlike the sparse arrays used in the previous experiments, is not ambiguity-prone. The field of view was taken as ±85° from boresight. The design parameters were Δ=0.3 dB, K=10, I=2, J=2 and γ=20.85. The ambiguity percentage results as a function of the SNR for m=10 and m=1 snapshots are shown in FIGS. 12A and 12B, respectively. The DML algorithm is ii s shown as a dashed line and the DOA tracking algorithm of the invention is shown as a solid line.

The results are very similar in nature to those obtained in the second experiment (FIGS. 11A and 11B); the only difference being the threshold values in the conventional method, which are higher in the ambiguity-prone 8λ circular array.

It will be appreciated by persons skilled in the art that the present invention is not limited to the directions-of arrival (DOA) tracking method described hereinabove, but is also applicable to other DOA functions, such as "MUSIC" (Multiple Single Classified) and sub-space fitting algorithms.

It will also be appreciated by persons skilled in the art that while the DOA tracking method described hereinabove refers to a single axis (azimuth), it is also applicable to a dual axis (azimuth and elevation) model.

Reference is now made to FIGS. 13A–D and 14A–D, which are mesh and contour plots of the likelihood function $\{L(\theta, \phi)\}$ of a typical source moving along a dual azimuth ($\theta$) and elevation ($\phi$) axis.

Figure 13A:
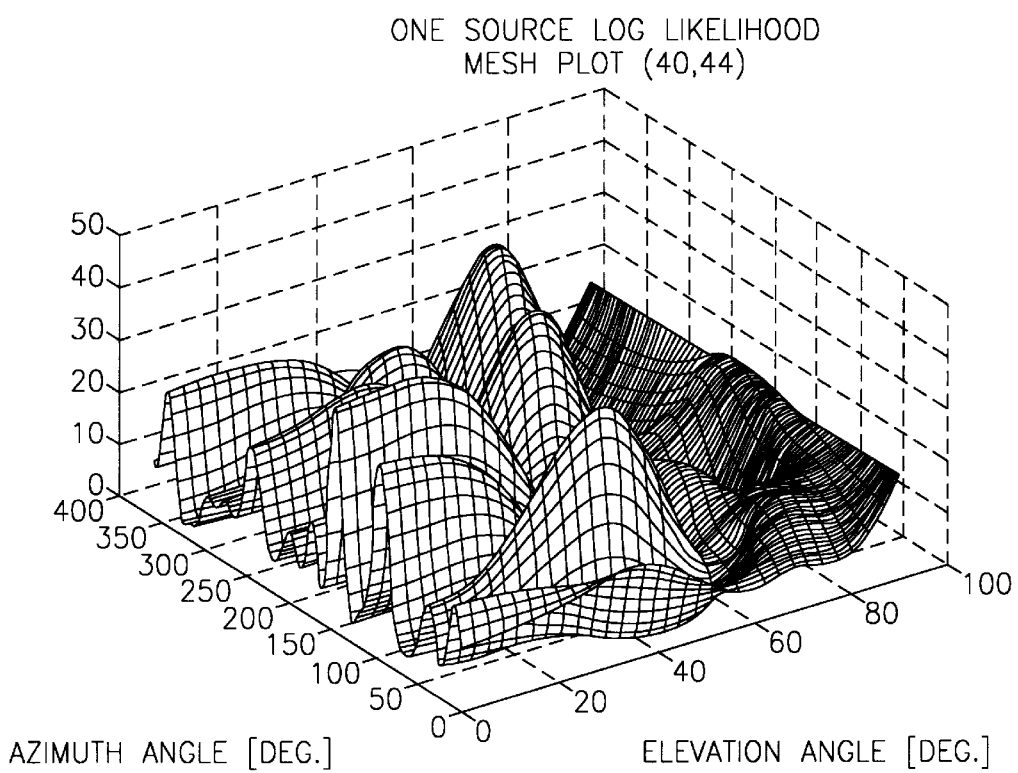
FIGS. 13A–13D and 14A–14D are mesh and contour plots of the likelihood function $\{L(\theta, \phi)\}$ of a typical source moving along a dual azimuth ($\theta$) and elevation ($\phi$) axis, respectively.
Figure 13B:
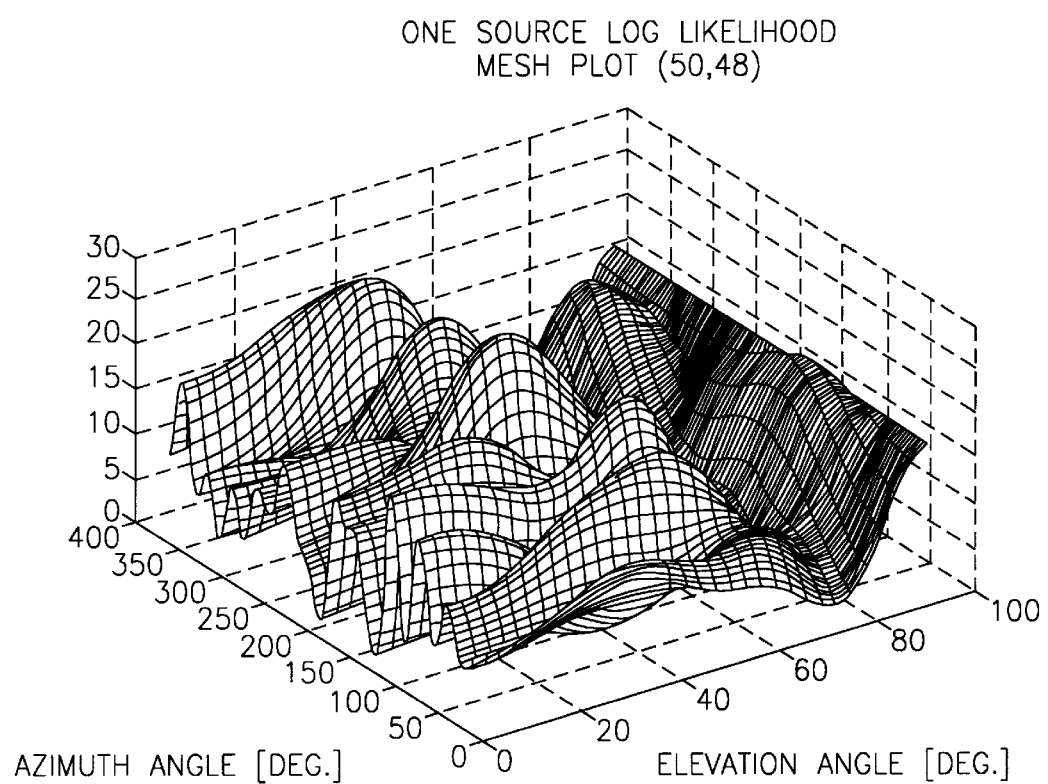
Figure 13C:
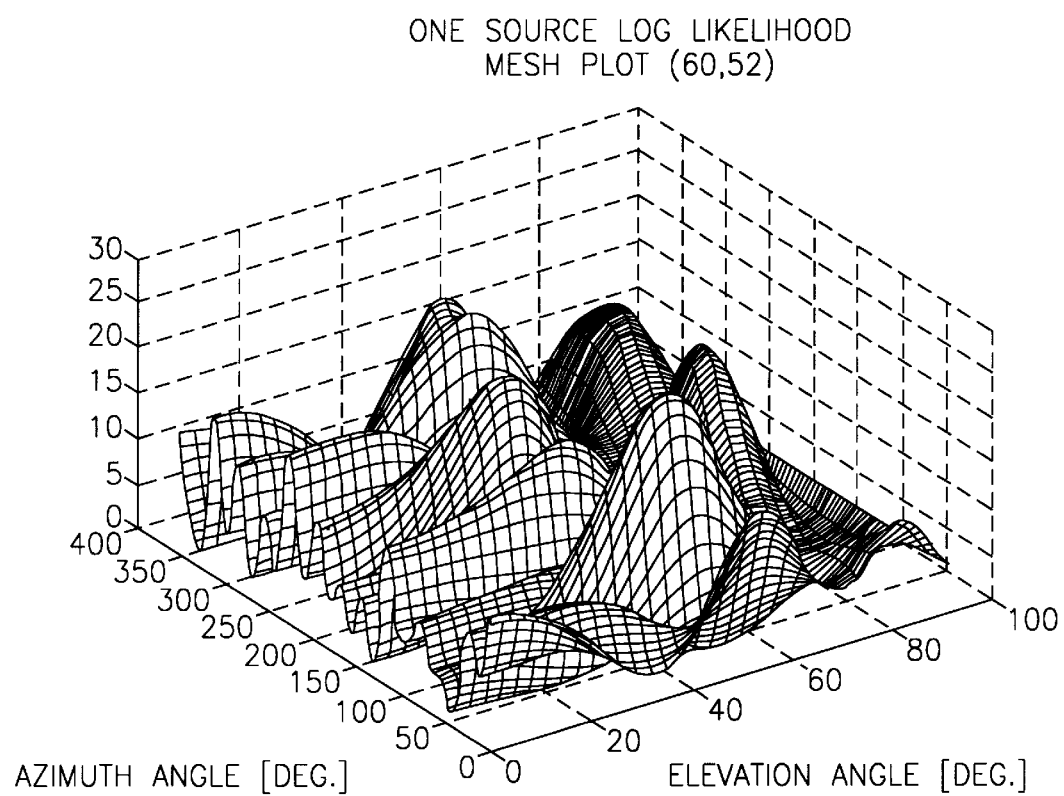
Figure 13D:
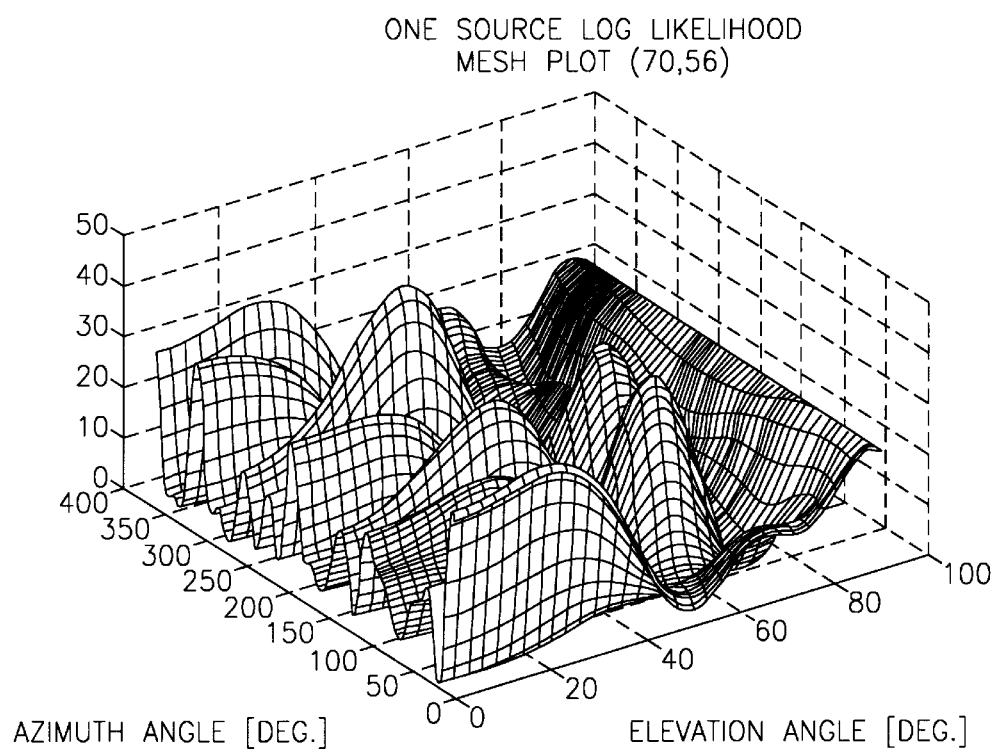
Figure 14A:
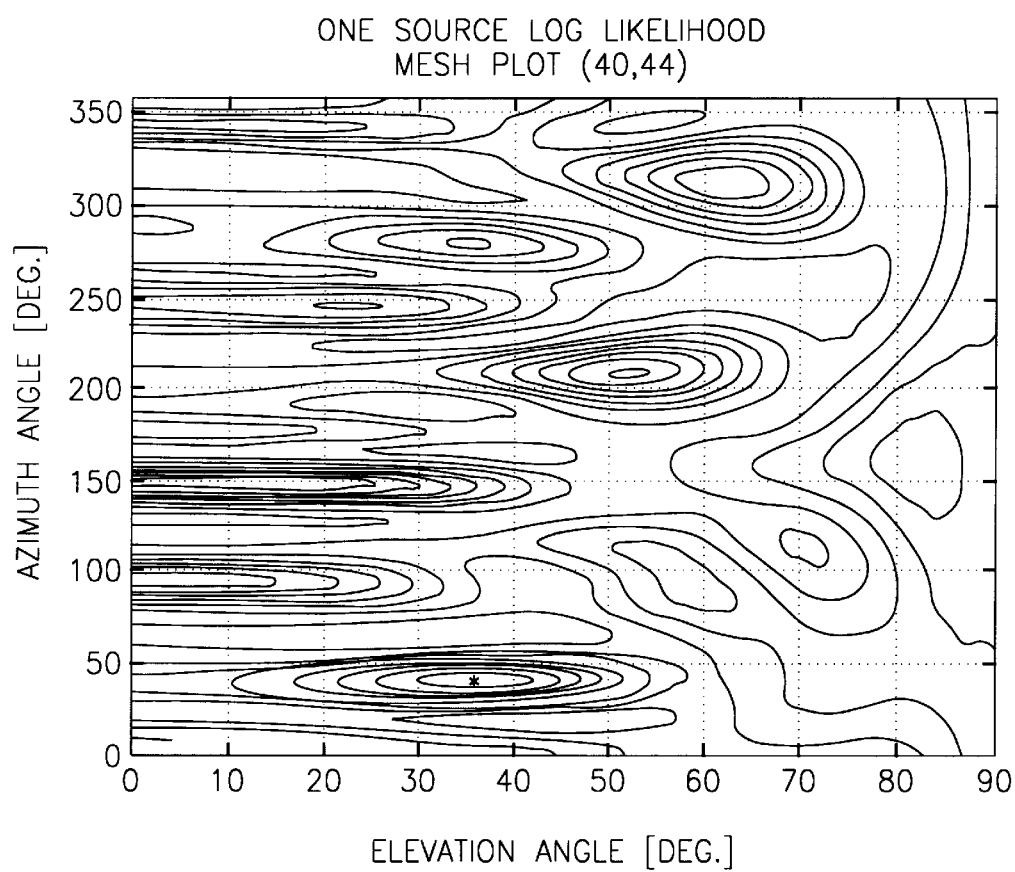
Figure 14B:
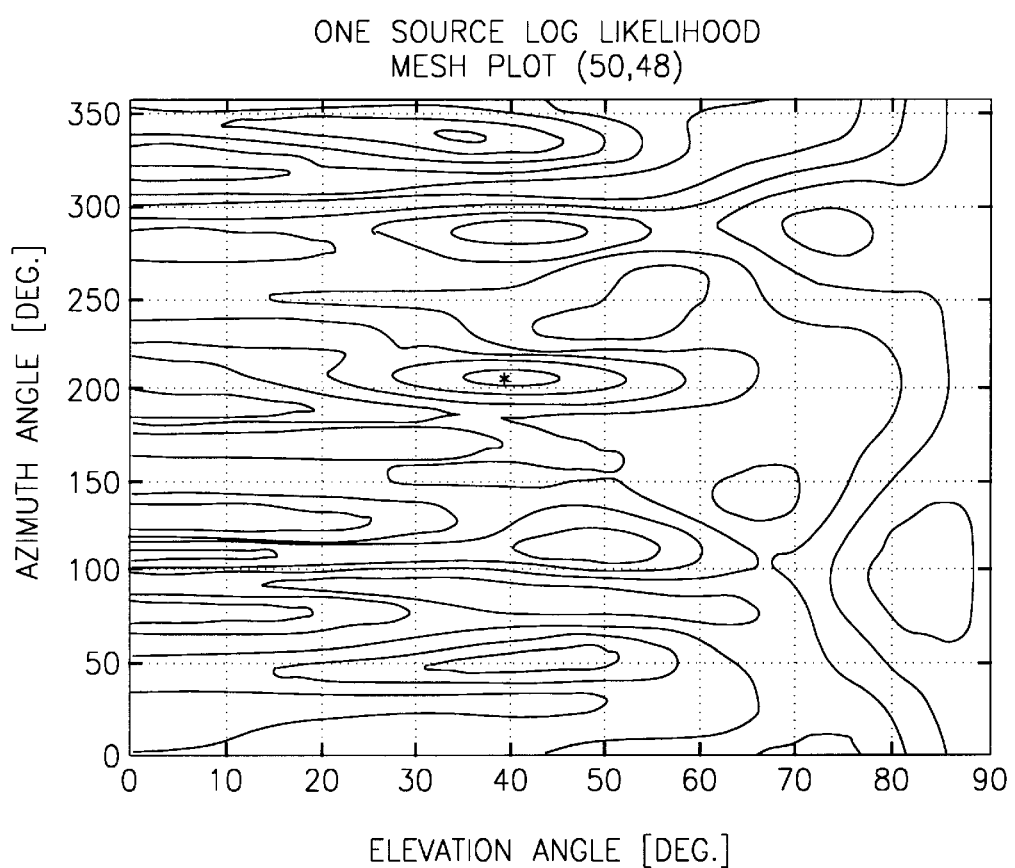
Figure 14C:
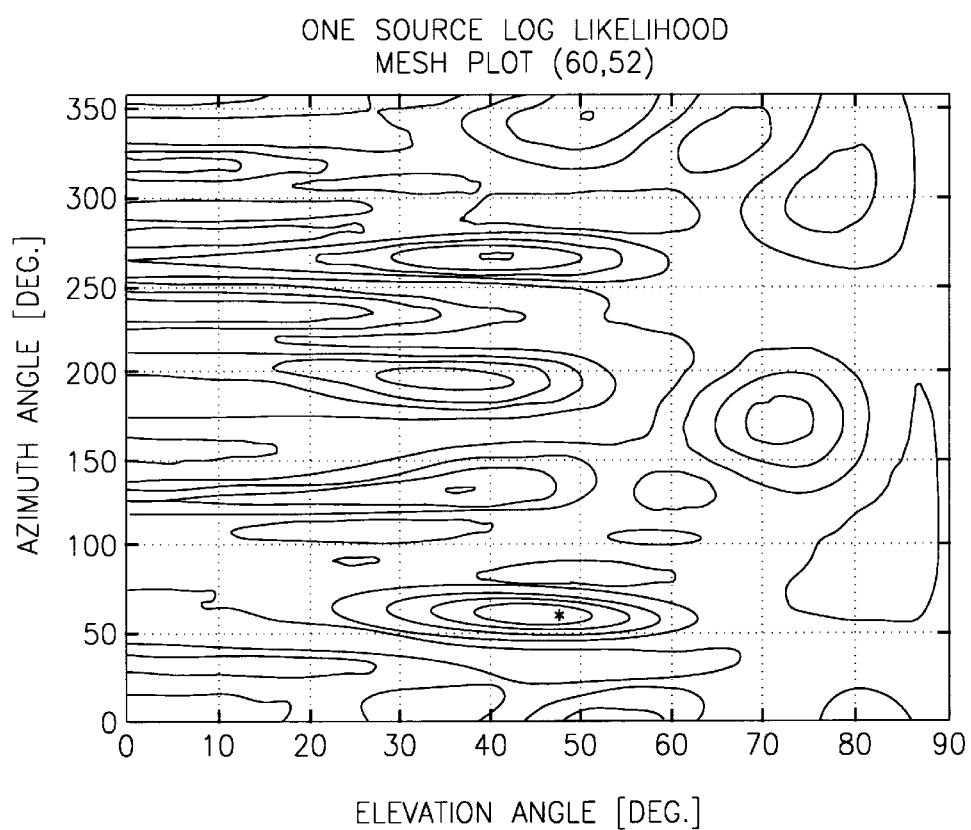
Figure 14D:
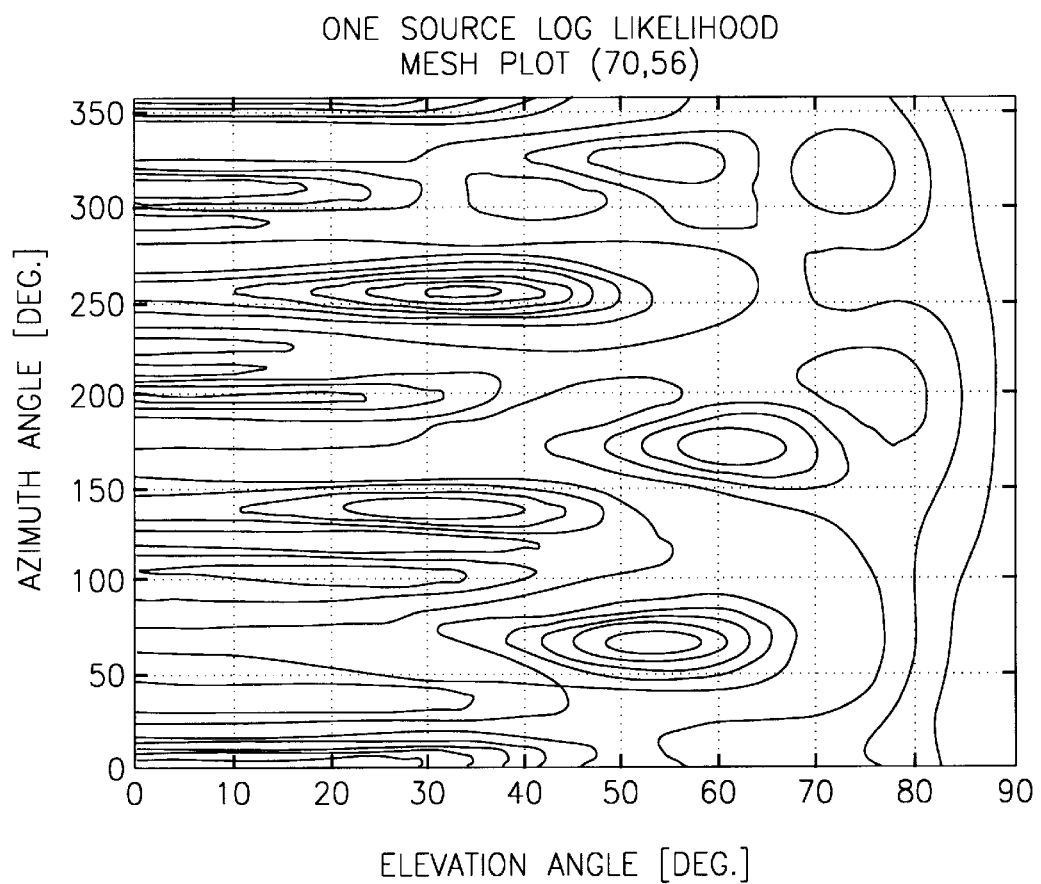

FIGS. 13A and 14A illustrate the log likelihood mesh plot for typical source having a signal to noise ratio (SNR) of 0 dB impinging on a 5 element circular array, moving along a dual azimuth ($\theta$)/elevation ($\phi$) axis of 40°/44°. FIGS. 13B and 14B illustrate the log likelihood mesh plot for typical source moving along a dual azimuth ($\theta$)/elevation ($\phi$) axis of 50°/48°. FIGS. 13C and 14C illustrate the log likelihood mesh plot for typical source moving along a dual azimuth ($\theta$)/elevation ($\phi$) axis of 60°/52°. FIGS. 13D and 14D illustrate the log likelihood mesh plot for typical source moving along a dual azimuth ($\theta$)/elevation ($\phi$) axis of 70°/56°.

In the case of FIGS. 13A and 14A and 13C and 14C, the highest peak indicate the correct likelihood azimuth and elevations. However, in the case of FIGS. 13B and 14B and 13D and 14D, the highest peaks do not represent the correct azimuth and elevation. The likely azimuth, elevation DOA (illustrated by the star (*) in the contour of FIG. 14B) is (206, 42) instead of (50,48). Also, (as illustrated by the stars (**) in the contour of FIG. 14D), the likely azimuth, elevation DOA is given as (258, 36) instead of (70, 56).

The method for DOA tracking of a source moving along a dual axis (azimuth ($\theta$) and elevation ($\phi$), in accordance with a preferred embodiment of the present invention, is similar to the method for a single axis source along the azimuth axis described hereinabove with respect to FIGS. 3–7, which are also referred to for the dual-axis source embodied hereinbelow.

Elements of this embodiment of the invention which are similar to elements which have been previously described with respect to the preferred embodiment hereinabove, are similarly designated and will not be further described.

Thus, for a moving source emitting a narrowband signal received by an array consisting of ρ sensors.

Using complex envelope notation and assuming that both the source and the sensors are confined to a plane and that the source is in the far-field of the array, the signals received by the array can be expressed by:

$$X(t)=a(\theta(t),\phi(t))s(t)+n(t) \qquad (27)$$

where ($\theta(t),\phi(t)$) is the DOA of the source, s(t) is the source's signal as received at the reference point, n (t) is the additive noise, and $\alpha(\theta(t),\phi(t))$ is the steering vector towards direction ($\theta,\phi$), given by:

$$a(\theta,\phi)=[a_1(\theta,\phi)e^{-j\tau_1(\theta,\phi)}, \ldots, a_p(\theta,\phi)e^{-jw\tau_p(\theta,\phi)}]^T \qquad (28)$$

where the signal is centered at ω, $a_i(\theta,\phi)$ is the amplitude gain of the i-th sensor towards direction ($\theta,\phi$), and $\tau_i(\theta,\phi)$ is the delay of i-th sensor, with respect to the reference point, in receiving a source from direction ($\theta,\phi$).

($\theta(t),\phi(t)$) is estimated every T seconds from batches of m samples taken from the array output, and the source dynamics are modeled by its angular position ($\theta(t),\phi(t)$) and angular velocity ($\dot\theta(t),\dot\phi(t)$) using the following discrete-time, constant velocity state space models. Filtering is carried our separately for azimuth and elevation as follows:

Azimuth:

$$y_{AZ}(k+1)=Fy_{AZ}(k)+w_{AZ}(k)$$
$$\theta(k)=Hy_{AZ}(k)+v_{AZ}(k) \qquad (29)$$

where $y_{AZ}(k)=[\theta(kT),\dot\theta(kT)]^T$ is the state vector and $\theta(k)$ is the estimated DOA of the source azimuth.

Elevation:

$$y_{EL}(k+1)=Fy_{EL}(k)+w_{EZ}(k)$$
$$\phi(k)=Hy_{EL}(k)+v_{EL}(k) \qquad (30)$$

where $y_{EL}(k)=[\phi(kT),\dot\phi(kT)]^T$ is the state reactor and $\phi(k)$ is the estimated DOA of the source elevation.

$w_{AZ}(k)$ and $w_{EL}(k)$ are the azimuth and elevation process noise, respectively, and $v_{EL}(k)$ and $v_{AZ}(k)$ are the measurement noise, respectively, and F and H are state transition matrix and measurement matrix, respectively, given by $$F = \begin{bmatrix} 1 & T \\ 0 & 1 \end{bmatrix} \qquad (31)$$
$$H = [1 \quad 0].$$

In order to estimate the DOA track ($\theta(t),\phi(t)$, given the data batches, the following assumptions are made.

A1: The change in the DOA of the source during the batch time is negligible.

A2: The change in the DOA of the source between consecutive batches is small. e.g. $\theta(kT) \approx \theta((k+1)T); \phi(kT) \approx \phi((k+1)T)$.

A3: The emitted signal s(t) is an unknown and arbitrary waveform.

A4: The additive noise samples $\{n(t_i)\}$ are i.i.d Gaussian complex random vectors with zero mean and covariance $\sigma^2 I$, where $\sigma^2$ is unknown.

A5: The process noise $w_{AZ}(k)$ and $w_{EL}(k)$ is Gaussian distributed with zero mean and covariance matrix $$Q = r \begin{bmatrix} \frac{1}{3}T^3 & \frac{1}{2}T^2 \\ \frac{1}{2}T^2 & T \end{bmatrix}, \tag{32}$$

where r is a known constant representing the acceleration variance.

A6: The measurement noise $v_{AZ}(k)/v_{EL}(k)$ is Gaussian distributed with zero mean and unknown variance $\sigma_{AZ}^2(k,\theta,\phi)/\sigma_{EL}^2(k,\theta,\phi)$.

A3 and A4 are not critical but are included to simplify the optimal DOA estimator. A5 is common in modeling of dynamic systems. A6 is plausible, recalling that the measurement noise is actually the DOA estimation error.

The method for DOA tracking for a dual-axis source below the ambiguity threshold, in accordance with a preferred embodiment of the present invention, similar to the method for a single axis source illustrated by the high level flow chart of FIG. 3.

Thus, all the peaks of the DOA likelihood function $L(\theta,\phi)$ are considered, that is, all the potential directions-of-arrival are regarded as potential track points. Firstly, the peaks of the likelihood function are found (step 102). Then using multiple target tracking techniques (step 104) together with data association (step 106), the track having the highest cumulative likelihood at given point is selected as the true track for that point (step 108).

All the peaks of the likelihood function $L(\theta,\phi)$ which are selected as potential track points (step 102) can be defined as the set $\Theta$ of points obeying the following equation:

$$\Theta = \left\{ (\theta; \varphi) : \frac{\partial L}{\partial \theta} = \frac{\partial L}{\partial \varphi} = 0; \begin{vmatrix} \frac{\partial^2 L}{\partial \theta^2} & \frac{\partial^2 L}{\partial \theta \partial \varphi} \\ \frac{\partial^2 L}{\partial \varphi \partial \theta} & \frac{\partial^2 L}{\partial \varphi^2} \end{vmatrix} < O \right\} \tag{33}$$

Alternatively, the number of peaks can be limited to peaks which are $\Delta$dB below the value of the global maximum. $\Delta$ is a design parameter determined from the ambiguity structure and the field of view. The set $\Theta$ is computed by the Roller-coaster algorithm or any other similar procedure. The likelihood value $$L(\tilde{\theta}_i, \tilde{\varphi}_i)$$

is computed using the following equation (32), where, for a batch consisting of m samples, the likelihood function $L(\theta,\phi)$ is given by the following expression:

$$L(\theta, \varphi) = \frac{a^H(\theta, \varphi)\hat{R}a(\theta, \varphi)}{a^H(\theta, \varphi)a(\theta, \varphi)} \tag{34}$$

where $\hat{R}$ is the sample-covariance matrix of the batch:

$$\hat{R} = \frac{1}{m}\sum_{i=1}^{m} x(t_i)x^H(t_i) \tag{35}$$

The peaks of $L(\theta,\phi)$ represent the most likely DOA for a given batch. Above the ambiguity threshold, the highest peak represents the most likely DOA. However, as described hereinabove with references to FIGS. 13A–13D and 14A–14D, below the ambiguity threshold, the height of the ambiguous peaks rise and occasionally exceed the height of the peak corresponding to the true DOA.

Reference is now also made to FIG. 4 which is more detailed flow chart illustration of the steps of selecting the most likely track (step 108). The procedures for dual axis tracking is similar to single axis tracking and reference is made to FIGS. 4–7 described hereinabove, using the same numeral references.

The peaks or a first batch of samples are calculated (step 130). The peaks for a second batch of samples are then calculated (step 132).

The peaks from these two batches are associated into groups (step 134). The peaks for a new batch of samples are then calculated (step 136) and this third batch is then associated (step 138) with the existing associated group (from step 134).

Then, using multiple tracking techniques (step 106), a prediction is made to select the track (step 140) having the highest cumulative likelihood as a true track (step 108).

A new batch of samples is taken and the peaks for this new batch are calculated (step 136). The peaks from the new batch is then associated (step 138) with the last associated group and a track selected (step 140). Steps 136–140 are repeated for each subsequent batch of samples.

The track life cycle (of tracking (step 104) and association (step 106)) consists of four stages, illustrated in the high level block diagram of FIG. 5 to which reference is now made. The stages of may be summarized as initialization (step 112), confirmation (step 114), updating (step 116) and termination (step 118).

A track is initialized (step 112) for a track point which is not associated with any existing track. After initialization, this track is considered as a tentative track. Until termination (step 118), for every new set of potential track points, the tentative and confirmed track points are updated (step 116) using the data association algorithm (step 104), to be described in detail hereinbelow. Reference is now made to FIG. 6 which is a detailed block diagram illustration of the relationship between the various stages of the track life cycle. A non-associated peak (or track point) (arrow 150) is initialized (step 112) and is considered as a tentative track (arrow 152). Tentative tracks 152 are associated (step 138) with other non-associated peaks (arrow 154) in order to try to associate them into an associated peak group (arrow 156).

This new tentative track (that is, including associated peak 156) is then checked (query box 157) to determine whether the track is outside the field of view (FoV). If the track is outside, the tentative track is terminated (step 118).

If the track is inside the field of view (FoV) the track is checked query box 158) to determine whether it meets the criteria of having "I" points associated with it out of "J" consecutive attempts. The values of "I" and "J" are predetermined parameters. If the criteria are met, the tentative track (arrow 160) is confirmed (step 114). The confirmed track is then updated (step 116).

If the query box 158 criteria are not met, the tentative track is terminated (step 118).

For each new batch of samples, for which the peaks are calculated (step 136), the new peaks (arrow 162) are then associated (step 138') with the updated tracks (arrow 164). As a result of this association (step 138'), associated peaks (arrow 166) are updated (step 116), while the non-associated peaks (arrow 154) are associated (step 138) with the tentative tracks (arrow 152), as described above.

Tracks are not updated in the following situations:
 (i) If there are more tracks than potential track points This situation may occur since the number of peaks of the likelihood function L(θ) depends on the source DOA and hence may vary.

(ii) If data association does not take place because the association is considered by the algorithm to be 'unlikely', After the track is updated (step 116), the updated track is again checked (query box 163) to determine whether the track is outside the field of view (FoV). If the track is outside, the tentative track is terminated (step 118). Furthermore, if a track is not updated during 'K' consecutive attempts (box 165) (K being a pre-determined parameter), the track is also terminated (step 118)

A track (which has not been terminated) is then merged (step 166). The merge procedure is described hereinbelow with reference to FIG. 6A.

While an active track is updated (step 116), its past values are used to predict, via a Kalman filter or similar procedure, the track position at the next measurement point. This predicted position is then used in the data association (138') and in filtering the DOA track. If a point was not associated to a track its predicted position is used as an associated point.

The Kalman filter equations for Azimuth ($y_{AZ}$) and Elevation ($y_{EL}$) are given separately by the following:

Azimuth:

$$\hat{y}_{AZ}(k|k) = \hat{y}_{AZ}(k|k-1) + K_{AZ}(k)[\theta(k) - H\hat{y}_{AZ}(k|k-1)] \quad (36)$$

$$K_{AZ}(k) = P_{AZ}(k|k-1)H^T[HP(k|k-1)H^T + \sigma^2(k,\theta,\phi)]^{-1} \quad (37)$$

$$P_{AZ}(k|k) = [I - K_{AZ}(k)H]P_{AZ}(k|k-1) \quad (38)$$

$$\hat{y}_{AZ}(k+1|k) = F\hat{y}_{AZ}(k|k) \quad (39)$$

$$P_{AZ}(k+1|k) = FP_{AZ}(k|k)F^T + Q \quad (40)$$

Elevation:

$$\hat{y}_{EL}(k|k) = \hat{y}_{EL}(k|k-1) + K_{EL}(k)[\theta(k) - H\hat{y}_{EL}(k|k-1)] \quad (41)$$

$$K_{EL}(k) = P_{EL}(k|k-1)H^T[HP_{EL}(k|k-1)H^T + \sigma^2(k,\theta,\phi)]^{-1} \quad (42)$$

$$P_{EL}(k|k) = [I - K_{EL}(k)H]P_{EL}(k|k-1) \quad (43)$$

$$\hat{y}_{EL}(k+1|k) = F\hat{y}_{EL}(k|k) \quad (44)$$

$$P_{EL}(k+1|k) = FP_{EL}(k|k)F^T + Q \quad (45)$$

where:

$\hat{y}_{AZ}(k|k-1)/\hat{y}_{EL}(k|k-1)$ is the predicted value of $\hat{y}_{AZ}(k)$ $\hat{y}_{EL}(k)$ based on the DOA estimates up to time (k−1)T, for azimuth and elevation, respectively.

$P_{AZ}(k|k-1)/P_{EL}(k|k-1)$ is the covariance matrix of the prediction error $y_{AZ}(k) - \hat{y}_{AZ}(k|k-1)/y_{EL}(k) - \hat{y}_{EL}(k|k-1)$ for azimuth and elevation, respectively.

$\hat{y}_{AZ}(k|k)/\hat{y}_{EL}(k|k)$ is the filtered estimate of $y_{AZ}(k)/y_{EL}(k)$ based on the DOA estimates up to time kT.

$P_{AZ}(k|k)/P_{EL}(k|k)$ is the covariance matrix of the filtered error $y_{AZ}(k) - \hat{y}_{AZ}(k|k)/y_{EL}(k) - \hat{y}_{EL}(k|k)$.

The measurement noise variance $\sigma_{AZ}^2(k,\theta,\phi)$ $\sigma_{EL}^2(k,\theta,\phi)$ is estimated, in order to carry out the recursions. If the number of samples per batch m is large enough, $\sigma_{AZ}^2(k,\theta,\phi)\sigma_{EL}^2(k,\theta,\phi)$ can be approximated by the known Cramer-Rao bound since it is relatively tight bound for these ambiguity-free tracks. The estimated measurement variance is denoted as $\sigma_{AZ}^2(k,\theta,\phi)\sigma_{EL}^2(k,\theta,\phi)$.

To initialize the Kalman filter the first two track points, θ(1),θ(2), are used:

$$\hat{y}_{AZ}(2|2) \left[\check{\theta}(2), \frac{(\check{\theta}(2) - \check{\theta}(1))}{T}\right]^T \quad (46)$$

$$\hat{y}_{EL}(2|2) \left[\check{\varphi}(2), \frac{(\check{\varphi}(2) - \check{\varphi}(1))}{T}\right]^T$$

$$P_{AZ}(2|2) = \bar{\sigma}_{AZ}^2 \begin{bmatrix} 1 & 1/T \\ 1/T & 2/T^2 \end{bmatrix}$$

$$P_{EL}(2|2) = \bar{\sigma}_{EL}^2 \begin{bmatrix} 1 & 1/T \\ 1/T & 1/T^2 \end{bmatrix}$$

where $$\bar{\sigma}_{AZ}^2 = \frac{\hat{\sigma}_{AZ}^2(1, \check{\theta}(1), \check{\varphi}(1)) + \hat{\sigma}_{AZ}^2(2, \check{\theta}(2), \check{\varphi}(2))}{2}$$

$$\bar{\sigma}_{EL}^2 = \frac{\hat{\sigma}_{EL}^2(1, \check{\theta}(1), \check{\varphi}(1)) + \hat{\sigma}_{EL}^2(2, \check{\theta}(2), \check{\varphi}(2))}{2}$$

Reference is now made to FIG. 6A which is a flow chart illustration of the step of merging tracks (step 166). For every pair of tracks, the merge procedure loop for dual axis is performed, as follows:

For $\{T_i(k)\}_{i=1}^{M(k)}$ and $\{T_j(k)\}_{j=1}^{M(k)}$, where i, j∈[1,M(k)];i>j the distance between the tracks is calculated (step 170) as follows:

For AZ:

$$D_{AZ}(T_i,T_j) = |\hat{\theta}_i(k|k) - \theta_j(k|k)|$$

For EL:

$$D_{EL}(T_i,T_j) = |\hat{\phi}_i(k|k) - \phi_j(k|k)|$$

The calculated $D_{AZ}$ and $D_{EL}$ are then compared with the design parameter $\Omega_{AZ}$ and $\Omega_{EL}$, respectively (step 172).

If the distance between the pair of tracks is within the design tolerance:

$D_{AZ}(T_i,T_j) < \Omega_{AZ}$ and $D_{EL}(T_i,T_j) < \Omega_{EZ}$ the two tracks ($T_i$, $T_j$) are merged (step 174). Then the merge procedure is repeated (steps 170–174) for every subsequent pair within the set of tracks.

If the distance between the pair of tracks is outside the design tolerance, merging does not take place and the merge procedure is repeated (steps 170–174) for the next pair within the set of tracks.

The merge procedure is as follows:

If the cumulative likelihood of "i" is greater than for "j" ($L_i(k) > L_j(k)$), then "j" is merged into "i" and "j" deleted. Otherwise, "i" is merged into "j" and "i" deleted.

The merge process differs depending on whether track "i" is tentative or not. If track "i" is tentative, the track "j" is updated (see step 116 above) as a "new point" taking the location of 'i';, $\{\hat{\theta}_i(k|k); \hat{\phi}_i(k|k)\}$ and value $L_i(k)$.

If track "i" is not tentative, the track "j" is updated as follows:

$$\hat{\theta}_j(k|k) = \frac{\hat{\theta}_j(k|k) + \hat{\theta}_i(k|k)}{2} \quad (47)$$

$$\hat{\varphi}_j(k|k) = \frac{\hat{\varphi}_j(k|k) + \hat{\varphi}_i(k|k)}{2}$$

Similar to single-axis sources, dual axis source use data association (108) to associate potential track points with the active tracks. Association is needed because the location and the height of the likelihood peaks can change substantially between consecutive DOA estimates below the ambiguity threshold.

For the purposes of describing the data association procedure (similar to that illustrated in FIG. 5), let $$\left\{ \breve{\theta}_j(k), \breve{\varphi}_j(k) \right\}_{j=1}^{N(k)}$$

denote the newly generated set of potential track points at time kT, each with its corresponding likelihood value $$L\left( \breve{\theta}_j(k), \breve{\varphi}_j(k) \right).$$

Also, let $\{T_i(k)_{i=1}^{M(k)}$, which is composed of $\{T_i^{AZ}(k)\}_{i=1}^{M(k)}$ and $\{T_i^{EL}(k)\}_{i=1}^{M(k)}$, Also, let $\{T_i(k)\}_{i=1}^{M(k)}$, denote the set of active tracks at time kT, each with its cumulative likelihood valve $\{L_i(k)\}_{i=1}^{M(k)}$ given by $$L_i(k) = L_i(k-1) + L\left( \breve{\theta}_i(k) \right), \quad (48)$$

The predicted state vector for azimuth and elevation are given by:
For Azimuth, $\}y_i^{AZ}(k|k-1)\}_{i=1}^{M(k)}$, predicted state is:

$$y_i^{AZ}(k|k-1) = [\hat{\theta}_i(k|k-1), \hat{\dot{\theta}}(k|k-1)]^T \quad (49)$$

For elevation, $\{y_i^{EL}(k|k-1)\}_{i=1}^{M(k)}$, predicted state is:

$$y_i^{EL}(k|k-1) = [\hat{\varphi}_i(k|k-1), \hat{\dot{\varphi}}(k|k-1)]^T \quad (50)$$

and its measurement prediction variance $\{s_i^{AZ}(k)\}_{i=1}^{M(k)}$; $\{s_i^{EL}(k)\}_{i=1}^{M(k)}$, given by:

$$s_i^{AZ}(k) = \quad (51)$$
$$E[e_{AZ}^2(k)] = HP_i^{AZ}(k|k-1)H^T + \hat{\sigma}_{AZ}^2(k, \hat{\theta}_i(k|k-1), \varphi_i(k|k-1))$$
and
$$e_{AZ} = \breve{\theta}(k) - H\hat{y}_i^{AZ}(k|k-1) \quad (52)$$

$$s_i^{EL}(k) = \quad (53)$$
$$E[e_{EL}^2(k)] = HP_i^{EL}(k|k-1)H^T + \hat{\sigma}_{EL}^2(k, \hat{\theta}_i(k|k-1), \hat{\varphi}_i(k|k-1))$$
and
$$e_{EL} = \breve{\varphi}(k) - H\hat{y}_i^{EL}(k|k-1). \quad (54)$$

The present invention solution to the association problem is based on probabilistic modeling of the association process and on using the maximum a-posteriori criterion as a selection rule.

Let $p_i(k|T_i(k))$ denote the a-priori probability that the i-th track be updated by a new track point at time kT. Regarding the cumulative likelihood score $L_i(k)$ as representing this a-priori probability, a natural estimator for $p_i(k|T_i(k))$ is given by $$\hat{p}_i(k|T_i(k)) = \frac{L_i(k)}{\sum_{n=1}^{M(k)} L_n(k)} \quad (55)$$

Let $d_{ij}^{AZ}(k)$ denote the angular distance between point $$\breve{\theta}_j(k)$$

to the i-th track predicted position $\hat{\theta}_i(k|k-1)$ $$d_{ij}^{AZ}(k) = \breve{\theta}_j(k) - \hat{\theta}_i(k|k-1). \quad (56)$$

Let $d_{ij}^{EL}(k)$ denote the angular distance between point $$\breve{\varphi}_j(k)$$

to the i-th track predicted position $$\hat{\varphi}_i(k|k-1)d_{ij}^{EL} = \breve{\varphi}_j(k) - \hat{\varphi}_i(k|k-1). \quad (57)$$

and let A(k) denote the true association between the existing tracks $\{T_i(k)\}_{i=1}^{M(k)}$ and the points $$\left\{ \breve{\theta}_j(k), \breve{\varphi}_j(k) \right\}_{j=1}^{N(k)}.$$

Conditioned on a true association, $\{d_{ij}^{AZ}(k)\}, \{d_{ij}^{EL}(k)\}$ can be modeled as independent and zero mean Gaussian random variables with variance $s_i^{AZ}(k); s_i^{EL}(k)$ respectively. That is, the probability density of $\{d_{ij}^{AZ}(k)\}\{d_{ij}^{EL}(k)\}$ is given by:

$$p\left(\{d_{ij}^{AZ}(k)\} | A(k), \{T_i^{AZ}(k)\}_{i=1}^{M(k)}\right) = \prod_{(i,j) \in A(k)} \frac{1}{\sqrt{2\pi s_i(k)}} \exp\left( \frac{-d_{ij}^{2AZ}(k)}{2s_i^{AZ}(k)} \right). \quad (58)$$

and $$p\left(\{d_{ij}^{EL}(k)\} | A(k), \{T_i^{EL}(k)\}_{i=1}^{M(k)}\right) = \prod_{(i,j) \in A(k)} \frac{1}{\sqrt{2\pi s_i(k)}} \exp\left( \frac{-d_{ij}^{2EL}(k)}{2s_i^{EL}(k)} \right). \quad (59)$$

Using the development of single axis tracking and expressions (21), (22), (23), the natural estimator for $p_i(k|T_i(k))$ amount to the minimization of the following criteria;

$$\min_{\{A_l(k)\}_{l=1}^{P(k)}} \sum_{(i,j) \in A_l(k)} D_{ij}(k) \quad (60)$$

where:

$$D_{ij}(k) = \frac{(d_{ij}^{AZ}(k))^2}{s_i^{AZ}(k)} + \log(s_i^{AZ}(k)) - \quad (61)$$

-continued $$2\log(\hat{p}_i^{AZ}(k\mid T_i(k)) + \frac{(d_{ij}^{EL}(k))^2}{s_i^{EL}(k)} + \log(s_i^{EL}(k)) - 2\log\hat{p}_i^{EL}(k\mid T_i(k))$$

An efficient minimization of Equation (61) over all possible associations is offered by the Munkres algorithm. Let $\{(i_n^*, j_n^*)\}_{n=1}^{P(k)}$ denote the set of point-track pairs that minimize (according to equation (61) and let their corresponding distances be denoted by $\{D_{i_n^* j_n^*}(k)\}_{n=1}^{P(k)}$.

If $D_{i_n^* j_n^*}(k) \leq \gamma$, where $\gamma$ is a threshold design parameter, the $j_n^*$-th input point is associated to the $i_n^*$-th track, and its likelihood score, $$L\left(\breve{\theta}_{j_n^*}, \breve{\varphi}_{j_n^*}\right),$$

is added to the track score. When $D_{i_n^* j_n^*}(k) > \gamma$ the input point is not likely to belong to a track, and thus is used to initiate a new track.

The association procedure described hereinabove is applicable when the prediction covariance, $s_i^{AZ}(k), s_i^{EL}(k)$ are available. Newly initialized tracks, that is tracks with only one point, lack this information. In order to associate a second point to an initiated track, the association distance is computed by $D_{ij}(k) = (d_{ij}^{AZ}(k))^2 + (d_{ij}^{EL}(k))^2$ and the association is performed using the array beamwidth as the threshold parameter $\gamma$.

Referring to the schematic flow chart illustration of FIGS. 7 and 7A, the method of data association (step 138), is applicable for dual axis sources as follows:

At every time kT, given a set of tracks $\{T_i(k)\}_{i=1}^{M(k)}$ and a new batch $\{x(t_i)\}_{i=1}^{m}$, the location of the potential track points $$\left\{\breve{\theta}_i, \breve{\varphi}_i\right\}_{i=1}^{N(k)}$$

and their likelihood value $$\left\{L\left(\breve{\theta}_i, \breve{\varphi}_i\right)\right\}_{i=1}^{N(k)}$$

are computed using Equations (60) and (61) respectively (step 202).

For every track $T_i(k)$, the following update steps (116-FIG. 5) are repeated:
a) The measurement prediction variance $s_i^{AZ}(k)/s_i^{EL}(k)$ using Equation (52/54) (step 204) is calculated.
b) The a-priori probability of the track, $\hat{p}_i^{AZ}(k|T_i^{AZ}(k))$ $\hat{p}_i^{EL}(k|T_i^{EL}(k))$ using Equation (56) (step 206) is calculated.

The association matrix D(k) is then calculated using Equation (57 and 58) (step 208).

Peaks are associated to tracks by minimizing Equation (61), using the Munkres algorithm (step 210).

Track-point pairs with association distance $D_{i_n^* j_n^*}(k)$ greater than the association threshold $\gamma$ are disregarded (step 212).

As described hereinabove with respect to FIGS. 7 and 7A, tracks with K consecutive association failures are terminated (step 118). New tracks are Initiated using the non-associated potential track points. Tentative tracks are confirmed (step 114 or terminated (step 118) using I-out-of-J rule (query box 158). All active tracks are filtered (step 214) using Kalman filter equations (9)–(13) and the position of the next track predicted (step 216). If the point was not associated to a track, it's predicted position is used as an associated point.

After the completion of the data association step (106), the most likely track $\hat{i}(k)$, is determined (step 108), using equation (25). The cumulative likelihood score is used and the track having the maximized score is selected. That is:

$$\hat{i}(k) = \arg\max(L_i(k)), \; i=1, \ldots M(k) \quad (62)$$

Given the most likely track, $\hat{i}(k)$, the most likely DOA at time kT, is given by the filtered position of the best track, $$\left(\hat{\theta}_{i(k)}(k\mid k), \hat{\varphi}_{i(k)}(k\mid k)\right).$$

It will also be appreciated by persons skilled in the art that the present invention is not limited by what has been particularly shown and described herein above. Rather the scope of the invention is defined by the claims which follow.

What is claimed is:

1. A method for direction of arrival (DOA) tracking of at least one source, the method comprising the steps of:
   having a direction finding (DF) system;
   capturing at least one signal from a wide spatial field-of-view;
   calculating a DOA function based on said at least one captured signal;
   selecting all the high peaks from the DOA function as potential track points;
   converting said potential track points into a plurality of tracks; and
   selecting a true track from said plurality of tracks.

2. A method according to claim 1 wherein said DOA tracking tracks at least one source along the azimuth axis.

3. A method according to claim 1 wherein said DOA tracking tracks at least one source along the dual axis of azimuth and elevation.

4. A method according to claim 2 wherein said at least one source is below the ambiguity threshold.

5. A method according to claim 3 wherein said at least one source is below the ambiguity threshold.

6. A method according to claim 1 wherein said step of converting said potential track points comprises the step of:
   associating said potential track points with active tracks into associated track points.

7. A method according to claim 6 wherein said step of converting further comprises the step of:
   using multiple tracking techniques.

8. A method according to claim 1 wherein said selecting step comprises the step of:
   selecting the track having the highest cumulative likelihood value.

9. A method according to claim 6 wherein said step of converting said potential track points comprises the steps of:
   initialization of a track point which is not associated with an existing track as a tentative track;
   confirmation of said tentative track;
   updating of said confirmed tracks; and
   termination of said tentative and confirmed tracks not meeting pre-determined criteria.

10. A method according to claim 9 wherein said step of updating further comprises the step of:
    updating said associated track points into updated tracks.

11. A method according to claim 10 and further comprising the step of:

associating said tentative track with other non-associated track points into a group of associated track points.

12. A method according to claim 11 wherein said step of confirmation comprises the step of:

confirming said track of associated track points if it meets the criteria of having "I" points associated with it out of "J" consecutive attempts, wherein the values of "I" and "J" are pre-determined parameters.

13. A method according to claim 11 wherein said step of termination comprises the step of:

disregarding any of said track of associated track points which does not meet the criteria of having "I" points associated with it out of "J" consecutive attempts, wherein the values of "I" and "J" are pre-determined parameters.

14. A method according to claim 10 and further comprising the step of:

associating said potential track points with said updated tracks into an associated peak group.

15. A method according to claim 9 wherein said step of updating comprises the step of:

using the past values of said updated track to predict the track position at the next measurement point of said DOA function.

16. A method according to claim 10 wherein said step of updating further comprises the step of:

merging every pair of said updated tracks.

17. A method according to claim 16 wherein said step of merging comprises the steps of:

calculating the distance between said pair of tracks;

comparing said calculated distance with a pre-determined distance;

if said calculated distance is less than said pre-determined distance, merging the cumulative likelihood of the less likely of said pair of tracks into the more likely of said pair of tracks and deleting the less likely of said pair of tracks; and repeating steps the above steps for the subsequent pair of tracks.

18. A method according to claim 15 wherein said step of updating further comprises the step of:

merging every pair of said updated tracks.

19. A method according to claim 18 wherein said step of merging comprises the steps of:

calculating the distance between said pair of tracks;

comparing said calculated distance with a pre-determined distance;

if said calculated distance is less than said pre-determined distance, merging the cumulative likelihood of the less likely of said pair of tracks into the more likely of said pair of tracks and deleting the less likely of said pair of tracks; and repeating steps the above steps for the subsequent pair of tracks.

20. A method according to claim 15 wherein said step of predicting utilizes a Kalman filter.

21. A method according to claim 11 wherein said step of termination comprises the step of:

disregarding any of said tracks of tentative or associated track points if any of said tracks of tentative or associated track points is not updated during 'K' consecutive attempts, wherein 'K' is a pre-determined parameter.

22. A method according to claim 11 wherein said step of termination comprises the step of:

disregarding any of said tracks of tentative or associated track points if any of said tracks of tentative or associated track points is outside a pre-determined field of view.

* * * * *